(12) United States Patent
Imagawa et al.

(10) Patent No.: US 7,227,996 B2
(45) Date of Patent: Jun. 5, 2007

(54) IMAGE PROCESSING METHOD AND APPARATUS FOR COMPARING EDGES BETWEEN IMAGES

(75) Inventors: Kazuyuki Imagawa, Fukuoka (JP); Tetsuya Yoshimura, Fukuoka (JP); Katsuhiro Iwasa, Iizuka (JP); Hideaki Matsuo, Fukuoka (JP); Yuji Takata, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 944 days.

(21) Appl. No.: 10/057,756

(22) Filed: Jan. 25, 2002

(65) Prior Publication Data

US 2002/0136459 A1   Sep. 26, 2002

(30) Foreign Application Priority Data

Feb. 1, 2001 (JP) ............................ 2001-025098
Apr. 19, 2001 (JP) ............................ 2001-120496

(51) Int. Cl.
G06K 9/00 (2006.01)
G06K 9/46 (2006.01)
G06K 9/62 (2006.01)
G06K 9/66 (2006.01)

(52) U.S. Cl. .................. 382/199; 382/181; 382/190; 382/191; 382/209; 382/280; 382/232; 382/218

(58) Field of Classification Search ............... 382/181, 382/190, 191, 199, 209, 288, 232, 218
See application file for complete search history.

(56) References Cited

U.S. PATENT DOCUMENTS 5,296,945 A * 3/1994 Nishikawa et al. .......... 358/518

(Continued)

FOREIGN PATENT DOCUMENTS

EP    0 552 770 A2   7/1993

(Continued)

OTHER PUBLICATIONS

Oh, Hwang-Seok, et al., "Digital Image Watermarking on a Special Object: the Human Face," Proceedings of the SPIE, vol. 3971, Security and Watermarking of Multimedia Contents II, May 2000, pp. 536-544.*

(Continued)

*Primary Examiner*—Bhavesh M Mehta
*Assistant Examiner*—John Strege
(74) *Attorney, Agent, or Firm*—Darby & Darby

(57) ABSTRACT

An image processing method for detecting an object from an input image using a template image, including inputting a specified image with respect to both a template image and an input image, calculating an edge normal direction vector of said specified image, generating an evaluation vector from said edge normal direction vector, subjecting the evaluation vector to orthogonal transformation, a step of performing a product sum calculation of corresponding spectral data with respect to each evaluation vector that has been subjected to orthogonal transformation and has been obtained for each of said template image and said input image, and a step of subjecting it to inverse orthogonal transformation and generating a similarity value map. The formula of the similarity value, the orthogonal transformation, and the inverse orthogonal transformation each have linearity. The pattern recognition is one in which the component of the similarity value is not subjected to positive/negative reversal through variations in brightness of the background.

32 Claims, 22 Drawing Sheets

U.S. PATENT DOCUMENTS

| | | | |
|---|---|---|---|
| 5,535,288 A * | 7/1996 | Chen et al. | 382/236 |
| 5,751,856 A * | 5/1998 | Hirabayashi | 382/232 |
| 5,781,650 A * | 7/1998 | Lobo et al. | 382/118 |
| 5,905,807 A * | 5/1999 | Kado et al. | 382/118 |
| 5,909,501 A * | 6/1999 | Thebaud | 382/124 |
| 5,990,901 A * | 11/1999 | Lawton et al. | 345/581 |
| 6,075,898 A | 6/2000 | Chase | |
| 6,154,566 A * | 11/2000 | Mine et al. | 382/219 |
| 6,195,460 B1 * | 2/2001 | Kobayashi et al. | 382/190 |
| 6,278,791 B1 * | 8/2001 | Honsinger et al. | 382/100 |
| 6,507,660 B1 * | 1/2003 | Wirtz et al. | 382/103 |
| 6,529,630 B1 * | 3/2003 | Kinjo | 382/190 |
| 2001/0014182 A1 * | 8/2001 | Funayama et al. | 382/282 |
| 2001/0052928 A1 * | 12/2001 | Imagawa et al. | 348/14.12 |

FOREIGN PATENT DOCUMENTS

| | | |
|---|---|---|
| JP | 05-028273 | 2/1993 |
| JP | 06-074732 | 3/1994 |
| JP | 10-063847 | 3/1998 |
| JP | 10-171989 | 6/1998 |
| JP | 11328359 A * | 11/1999 |
| JP | 2000-030062 | 1/2000 |
| JP | 2000-099717 | 4/2000 |
| JP | 2000-148980 | 5/2000 |
| JP | 2000-149029 | 5/2000 |
| JP | 2000-209425 | 7/2000 |
| JP | 2000-242787 | 9/2000 |

OTHER PUBLICATIONS

Johansson B et al.: "Detecting rotational symmetries using normalized convolution"; Sep. 3, 2000, Pattern Recognition, 2000, Proceedings, 15th International Conference on Sep. 3-7, 2000 at Los Alamitos, CA,; IEEE Comput. Soc. US, pp. 496-500, XP010533335; ISBN; 0-7695-0750-6; p. 496, Section 2: "Local orientation", continued on the first two paragraphs of p. 497.

Rosenfeld A et al.:"Digital picture processing"; 1982, Digital Picture Processing, Orlando, Academic Press, US, vol. 1, XP002246743.

T. Awakura et al, "Automatic Recognition of Road Signs"; Technical Report of IEICE PRMU98-201 (Jan. 1999) pp. 69-76.

"Face Detection and Tracking using Edge Orientation Information" by Bernhard Fröba and Christian Küblbeck, Visual Communications and Image Processing 2001, Proceedings of SPIE vol. 4310, 2001, pp. 583-594.

English Language Abstract of JP 05-028273.

* cited by examiner

Fig. 2(a)    Fig. 2(b)    Fig. 2(c)
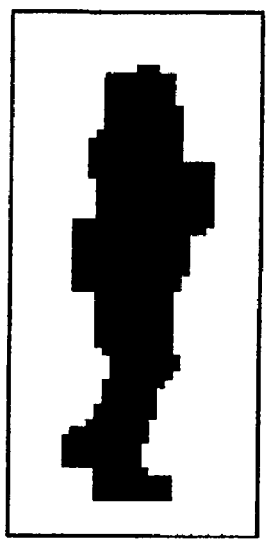
template image
X component
Y component
Fig. 3
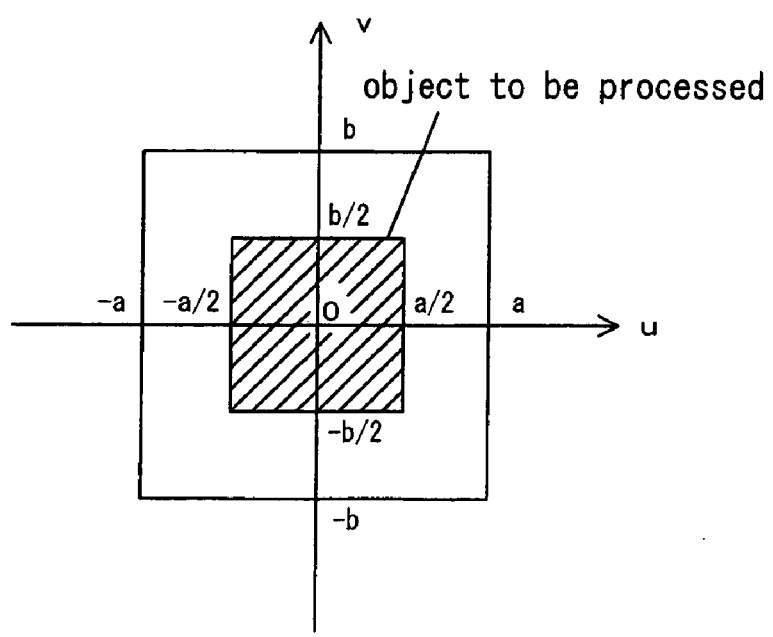

Fig. 4(a)
input image
Fig. 4(b)  Fig. 4(c)
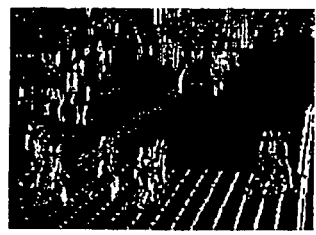 
X component   Y component
Fig. 5(a)
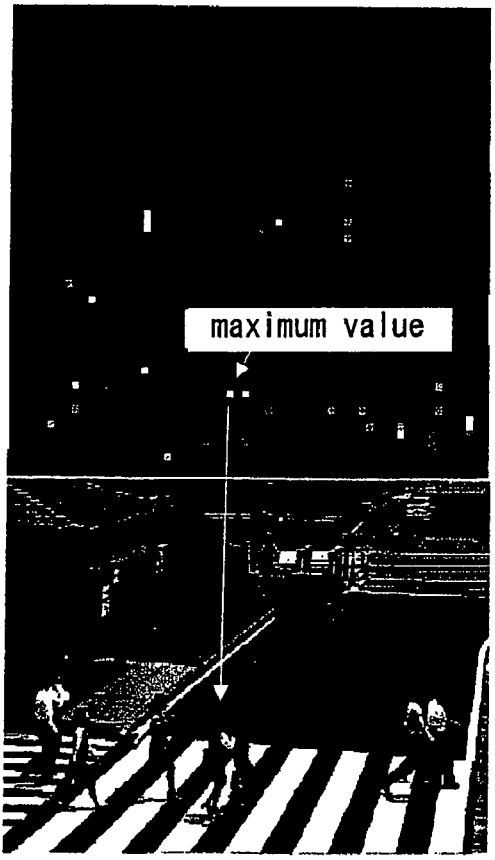
maximum value
Fig. 5(b)

Fig. 6
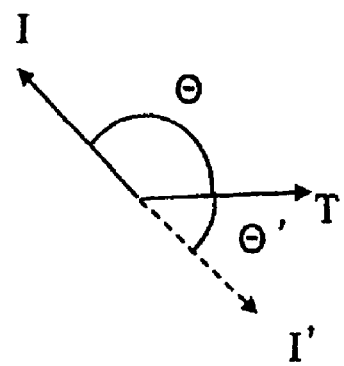
Fig. 7(a)    Fig. 7(b)
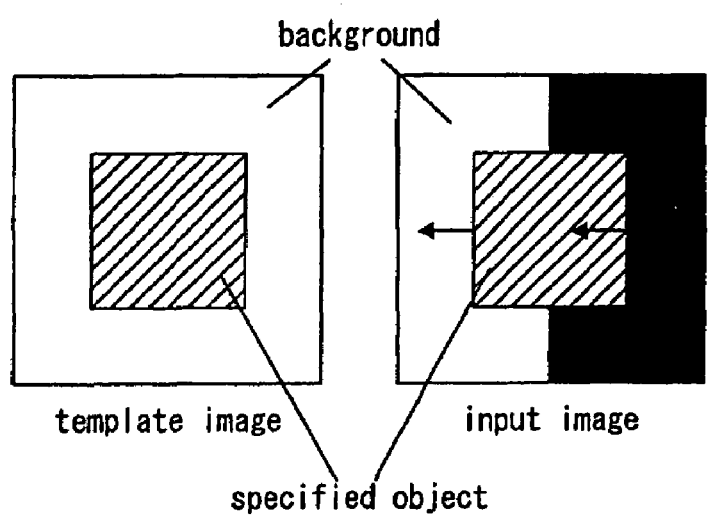
template image    input image
specified object
Fig. 8(a)    Fig. 8(b)
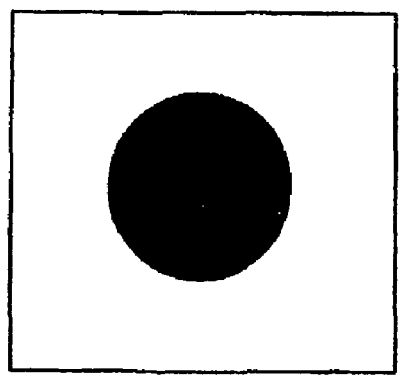 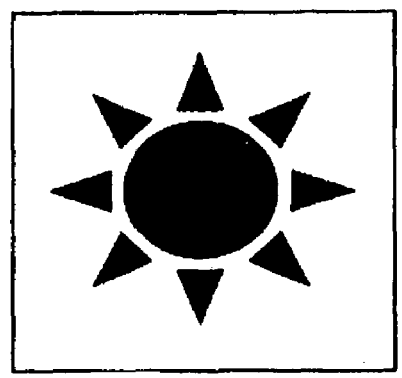

Fig. 12
Fig. 13(a)　　　Fig. 13(b)　　　Fig. 13(c)
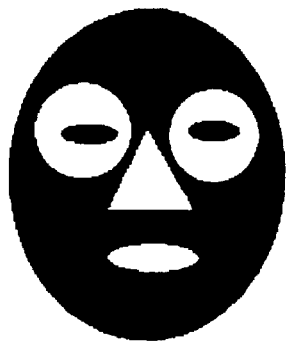 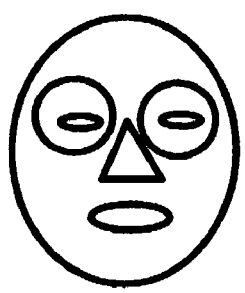 
Fig. 13(d)　　　Fig. 13(e)　　　Fig. 13(f)
 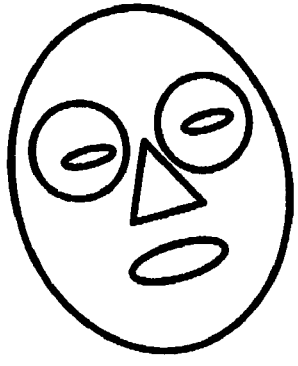 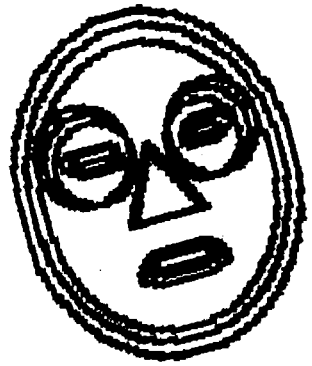

template image mask pattern q

Fig. 22(a)
Fig. 22(b)
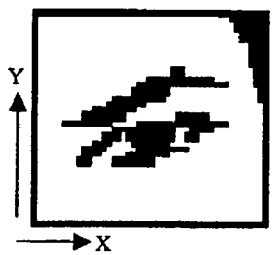
Fig. 22(c)
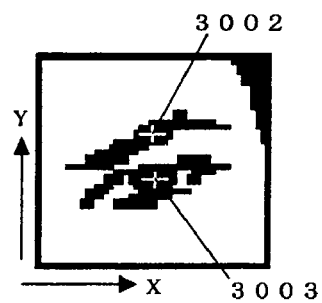
Fig. 23(a)
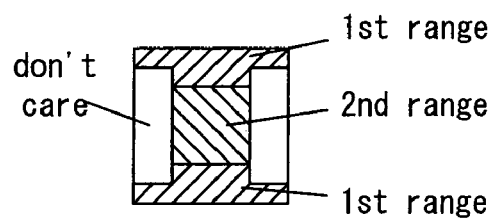
Fig. 23(b)      Fig. 23(c)      Fig. 23(d)
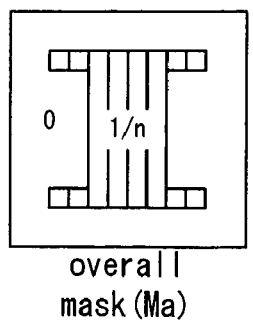  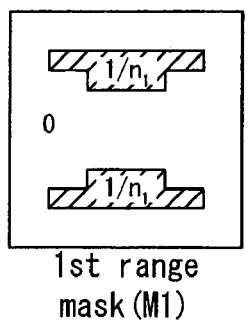  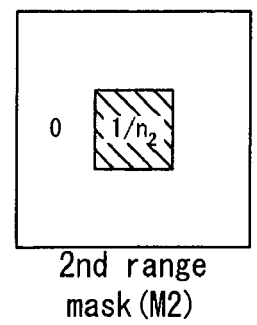
overall       1st range      2nd range
mask (Ma)     mask (M1)      mask (M2)

digital watermark embedded part detected face range

IMAGE PROCESSING METHOD AND APPARATUS FOR COMPARING EDGES BETWEEN IMAGES

BACKGROUND OF THE INVENTION

1. Field of the Invention

The present invention relates to an image processing method for detecting an object from an input image using a template image, and relates to an image processing apparatus therefor.

2. Description of the Related Art

Conventionally, a technique is well known in which a template image is pre-registered, and the position in an input image of an image similar to the template image is detected by pattern matching between the input image and the template image. However, since distorted perceptions are liable to be shaped according to the manner in which the background of the image similar to the template image is formed, Japanese Published Unexamined Patent Application No. Hei-5-28273 discloses a technique that has been developed to solve this problem. In this publication, a similarity value between the template image and the image corresponding to the template image is defined by the mathematical Formula 1.

Formula 1
Cv: Correlation coefficient (similarity value)
M: Number of pixels of template image in x direction
N: Number of pixels of template image in y direction
Sx: Derivative value of input image S in x direction
Sy: Derivative value of input image S in y direction
Tx: Derivative value of template image T in x direction
Ty: Derivative value of template image T in y direction $$\sigma_{SO} = \sqrt{\frac{1}{MN}\sum_{i=1}^{M}\sum_{j=1}^{N}(Sx_{ij}^2 + Sy_{ij}^2)}$$

$$\sigma_{TO} = \sqrt{\frac{1}{MN}\sum_{i=1}^{M}\sum_{j=1}^{N}(Tx_{ij}^2 + Ty_{ij}^2)}$$

$$\rho_{VO} = \frac{1}{MN}\sum_{i=1}^{M}\sum_{j=1}^{N}(Tx_{ij}Sx_{ij} + Ty_{ij}Sy_{ij})$$

$$Cv = \frac{\rho_{VO}}{\sigma_{TO}\sigma_{SO}}$$

In detail, an inner product ($\cos \theta$) of an angle $\theta$ between a normal direction vector of the edge of the template image and a normal direction vector of the edge of the input image is a component of the similarity value.

However, there exists a problem in that, as described later in detail, if the brightness of a background periphery of an image of an object is uneven, the positive and negative values of the inner product are reversed. This makes the similarity value unsuitable for the real image, and distorted perceptions are easily produced, thus making it difficult to obtain a desirable recognition result.

Additionally, the similarity value formula is nonlinear with respect to the normal direction vectors of the edges of the input and template images, and processing for the template image and processing for the input image must be performed simultaneously.

Further, the template image is scanned on the input image. A correlated calculation of the input image and the reference image must be performed for each scanning point. Therefore, in practicality, a resulting expansion of the amount of calculation makes real-time processing impossible.

OBJECTS AND SUMMARY OF THE INVENTION

It is therefore an object of the present invention to provide an image processing method and an image processing apparatus capable of obtaining an accurate, clear recognition result and capable of performing high speed processing.

In an image processing method according to a first aspect of the present invention, the amount of matching between a template image and an input image is evaluated using a similarity value map. An evaluation vector is generated for each of the template and input images. The evaluation vector includes a component in which a normal direction vector of an edge of a specified image undergoes an even number of angular transformations.

With this structure, the matching therebetween is properly evaluated with no influence on the similarity value even in a case in which the positive and negative of an inner product ($\cos \theta$) of an angle $\theta$ between a normal direction vector of the edge of the template image and a normal direction vector of the edge of the input image are reversed by unevenness in the brightness of its background.

An image processing method according to a second aspect of the present invention includes a step of inputting a specified image for each of a template image and an input image and calculating a normal direction vector of an edge of the specified image; a step of generating an evaluation vector from the edge normal direction vector; a step of subjecting the evaluation vector to an orthogonal transformation; a step of performing a product sum calculation of corresponding spectral data for each evaluation vector, which has been subjected to orthogonal transformation, obtained for the template image and input image; and a step of subjecting a result of the product sum calculation to an inverse orthogonal transformation and generating a map of similarity values; in which a formula of the similarity values, the orthogonal transformation, and the inverse orthogonal transformation each have linearity.

With this structure, a Fourier transformation value of the template image and a Fourier transformation value of the input image do not need to be simultaneously calculated. In other words, the Fourier transformation value of the template image is obtained prior to that of the input image, thus making it possible to lighten the processing burden and improve processing speed.

An image processing method according to a third aspect of the present invention includes a step of compressing each evaluation vector, which has been subjected to the orthogonal transformation, so as to reduce the processing amount.

With this structure, what is processed is limited only to an effective component (e.g., low-frequency component). Thereby processing speed is improved.

In an image processing method according to a fourth aspect of the present invention, for the template image, the steps taken until the evaluation vector that has been subjected to the orthogonal transformation is compressed are executed before the input image is input, and the result is stored in a recording unit.

With this structure, processing relating to the template image is completed merely by reading from the recording unit, and processing speed is improved.

In an image processing method according to a fifth aspect of the present invention, the evaluation vector is normalized with respect to a vector length.

With this structure, the stability of pattern extraction is improved without undergoing length variations though the strength of the edge of the input image varies, and the vector length varies according to a photographic condition.

In an image processing method according to a sixth aspect of the present invention, the evaluation vector of the template image is normalized by the number of edge normal direction vectors.

Therefore, independent of whether the number of edges of the template image is large or small, a similarity is evaluated on the same scale by dividing it by n and normalizing it.

In an image processing method according to a seventh aspect of the present invention, the data amount is reduced by use of complex conjugate properties of an orthogonal transformation before performing a product sum calculation, and the data amount is restored after performing the product sum calculation.

With this structure, the data amount is greatly reduced to improve processing speed, and memory capacity is saved.

In an image processing method according to an eighth aspect of the present invention, the template image is enlarged/reduced to various sizes, and the evaluation vector of each size is subjected to addition processing.

With this structure, matching does not need to be repeatedly carried out for each size, and processing speed is improved.

In an image processing method according to a ninth aspect of the present invention, for the template image, the addition processing of the evaluation vector is carried out after executing the step of compressing each evaluation vector so as to reduce the processing amount.

With this structure, the amount of data subjected to addition processing is reduced, and processing speed is improved.

In an image processing method according to a tenth aspect of the present invention, the template image is an image of a typified face.

With this structure, not only the total position of a face but also the partial position of a main face part, such as the eyes, nose, or mouth, are recognized.

In an image processing method according to an 11th aspect of the present invention, a peak pattern that steepens the peak of the similarity value is prepared. The result obtained by subjecting data of this peak pattern to an orthogonal transformation is applied to the product sum calculation.

With this structure, a part similar to a template is detected from the input image more clearly and stably while reflecting the peak pattern.

In an image processing method according to a 12th aspect of the present invention, a mask pattern that depends on the template image is formed. The result obtained by subjecting data of this mask pattern to an orthogonal transformation is applied to the product sum calculation.

With this structure, closer detection is performed while adding attributes other than the shape of the template image.

In an image processing method according to a 13th aspect of the present invention, the mask pattern shows an average of the number of pixels in an image of the template image.

With this structure, attributes of the template image are reflected by a simple mask pattern.

An image processing method according to a 14th aspect of the present invention further includes a step of, for the template image, processing positive and negative signs of the evaluation vector of the original template image and generating an evaluation vector of a bilaterally symmetrical image with respect to the original template image, by which the generated evaluation vector is applied to the product sum calculation.

With this structure, amount of the template image to be recorded is reduced, and the evaluation vector of the template image that has been bilaterally reversed is generated without direct calculation, thus making it possible to improve processing speed.

In an image processing method according to a 15th aspect of the present invention, a map of point biserial correlation coefficients is generated on the basis of an extracted face image, and a position of the face part is calculated.

With this structure, the position of the face part is specified more accurately.

In an image processing method according to a 16th aspect of the present invention, the distribution of projection values in the y-direction is calculated on the basis of the extracted face image by use of the mask pattern. Two maximum points are calculated from this distribution. An extent between these maximum points is output as a mouth range.

With this structure, the mouth range is specified more accurately.

In an image processing method according to a 17th aspect of the present invention, the input image is divided into only the face image and parts other than the face image on the basis of the extracted face image. A digital watermark is embedded only into the face image. The face image into which the digital watermark has been embedded and parts other than the face image are combined and output.

With this structure, watermark data is concentratively embedded into the face part which might be falsified.

In an image processing method according to a 18th aspect of the present invention, the input image is divided into only the face image and parts other than the face image on the basis of the extracted face image. Only the face image is edited. The face image that has been edited and parts other than the face image are combined and output.

With this structure, only the face image is corrected without exerting any influence on parts other than the face.

In an image processing method according to a 32nd aspect of the present invention, a face image is cut out from the input image on the basis of the extracted face image. A facial inner image is then extracted from the face image that has been cut out. A feature that serves to correct the face image is then calculated on the basis of the extracted face image. A correction function is then determined on the basis of the obtained feature, and image correction based on the determined correction function is applied at least to the face image that has been cut out.

With this structure, the face image is corrected according to the feature of only the facial inner image without being adversely affected by images that are not the face image. Therefore the viewability of the face image is infallibly improved.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2(*a*) is a view showing a template image.

FIG. 2(b) is a view showing an edge extraction image (x component) of the template image.

FIG. 2(c) is a view showing an edge extraction image (y component) of the template image.

FIG. 3 is an explanatory drawing for explaining the compression processing of an evaluation vector.

FIG. 4(a) is a view showing an input image.

FIG. 4(b) is a view showing an edge extraction image (x component) of the input image.

FIG. 4(c) is a view showing an edge extraction image (y component) of the input image.

FIG. 5(a) is a view showing a map of similarity values.

FIG. 5(b) is a view showing the input image.

FIG. 6 is a drawing to which reference will be made in explaining a positive/negative reversal of an inner product.

FIG. 7(a) is a view showing a template image.

FIG. 7(b) is a view showing an input image.

FIGS. 8(a) and 8(b) are views showing template images.

FIG. 12 is a view showing an input image.

FIG. 13(a) is a view showing a template image.

FIG. 13(b) is a view showing an edge extraction image.

FIG. 13(c) is a view showing an enlargement/reduction template image.

FIG. 13(d) is a view showing a template image.

FIG. 13(e) is a view showing an edge extraction image.

FIG. 13(f) is a view showing an enlargement/reduction template image.

FIG. 22(a) is a view showing an input image.

FIG. 22(b) is a view showing the eyes/eyebrow candidate range.

FIG. 22(c) is a view showing a recognition result.

FIG. 23(a) is a view showing a filter shape according to embodiment 7 of the present invention.

FIG. 23(b) is an explanatory drawing of an overall range mask.

FIG. 23(c) is an explanatory drawing of a range-1 mask.

FIG. 23(d) is an explanatory drawing of a range-2 mask.

DETAILED DESCRIPTION OF THE PREFERRED EMBODIMENTS (Embodiment 1)

FIGS. 1 through 8(b) show the basic form of an image processing apparatus of the present invention.

Figure 1:
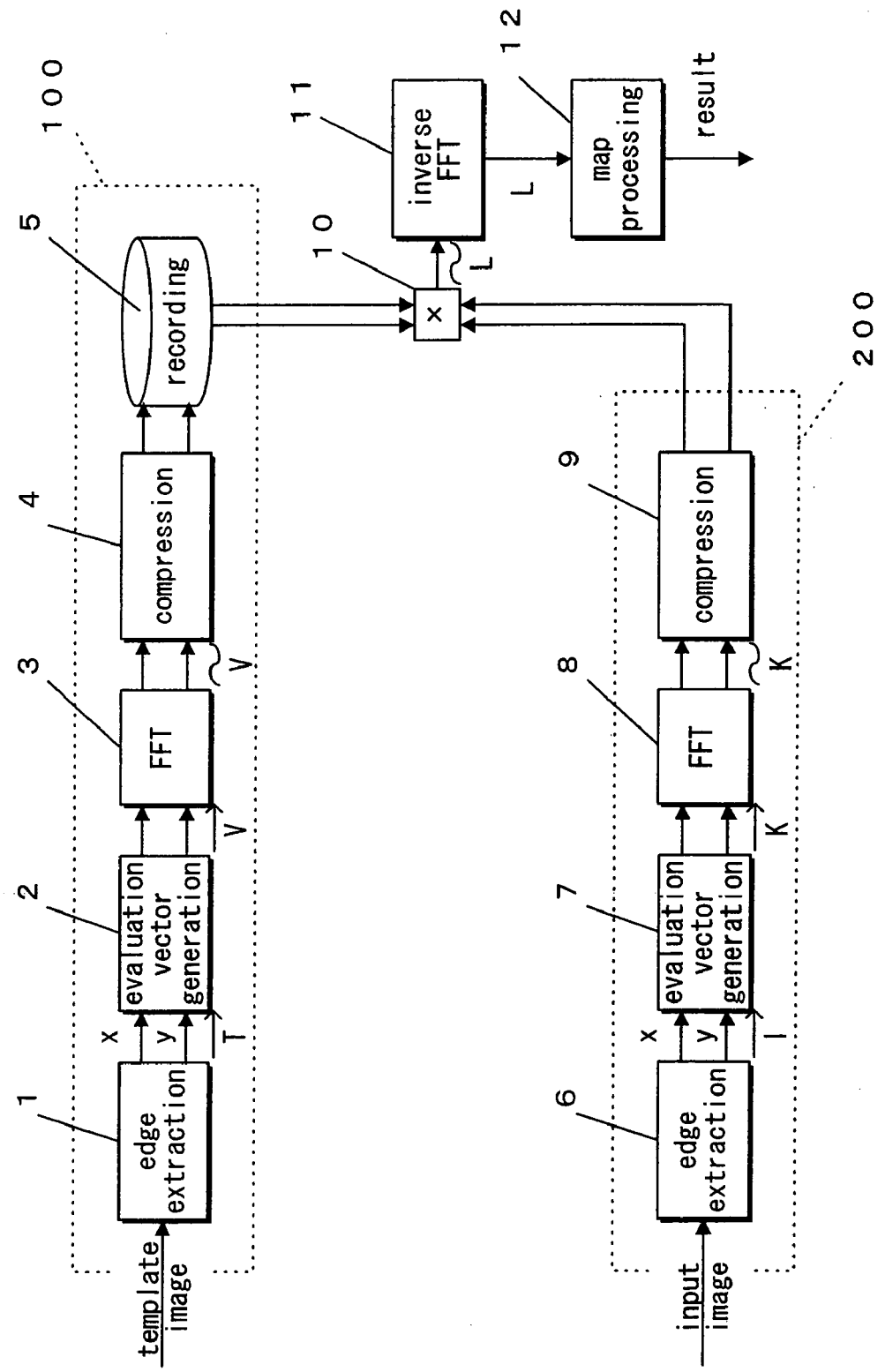
FIG. 1 is a block diagram of an image processing apparatus according to Embodiment 1 of the present invention.

Referring to FIG. 1, the image processing apparatus according to Embodiment 1 includes two different processing parts, i.e., a template image processing part 100 and an input image processing part 200. The apparatus evaluates matching between a template image and an input image using a map of similarity values L. In this image processing apparatus, both the template image processing part 100 and the input image processing part 200 perform orthogonal transformation with linearity, then perform multiplication, and calculate the similarity values L by inverse orthogonal transformation.

It should be noted that FFT (Fast Discrete Fourier Transformation) is used as an orthogonal transformation in all embodiments described later. However, not only FFT but also Hartley transformation or number theoretic transformation can be used. In such cases, it will be understood that the term "Fourier transformation" in the following description should be replaced by Hartley transformation or number theoretic transformation.

Both the template image processing part 100 and the input image processing part 200 employ an inner product of edge normal direction vectors so that a correlation becomes proportionately higher with proximity between the directions of the edge normal direction vectors. This inner product is evaluated using an even-numbered times angle expression. For convenience, only a double size angle is hereinafter described as an example of even-numbered times angle, but the same effect with the present invention is produced using other even-numbered times angles such as a quadruple size or a sextuple size.

An edge extraction unit 1 in the template image processing part 100 applies differential processing (edge extraction) to a template image in x and y directions, and outputs an edge normal direction vector of the template image.

In this embodiment, a Sobel filter of Formula 2 is used for the x direction, and a Sobel filter of Formula 3 is used for the y direction.

$$\begin{bmatrix} -1 & 0 & 1 \\ -2 & 0 & 2 \\ -1 & 0 & 1 \end{bmatrix} \qquad \text{Formula 2}$$

$$\begin{bmatrix} -1 & -2 & -1 \\ 0 & 0 & 0 \\ 1 & 2 & 1 \end{bmatrix} \qquad \text{Formula 3}$$

An edge normal direction vector of the template image defined by the following formula is obtained with these filters.

$$\vec{T} = (T_X, T_Y) \qquad \text{Formula 4}$$

This embodiment takes an example in which an image of a person in a specific posture who is walking through a pedestrian crossing is extracted from an input image of the vicinity of the pedestrian crossing.

The template image of the person is that of FIG. 2(a), for example. If the filter processing of Formula 2 is applied to the template image of FIG. 2(a), a result (x component) as shown in FIG. 2(b) is obtained. If the filter processing of Formula 3 is applied to the template image of FIG. 2(a), a result (y component) as shown in FIG. 2(c) is obtained.

An evaluation vector generation unit 2 inputs an edge normal direction vector of the template image from the edge extraction unit 1, and outputs the evaluation vector of the template image to an orthogonal transformation unit 3 through processing described later.

First, the evaluation vector generation unit 2 normalizes the length of the edge normal direction vector of the template image according to the following formula.

$$\vec{U} = (U_X, U_Y) = \frac{\vec{T}}{|\vec{T}|} \qquad \text{Formula 5}$$

Generally, the edge strength of the input image varies according to the existing photographic condition. However, an angular difference between the edges of the input and template images (or, a subordinate function value that varies according to this angular difference) is not susceptible to the photographic condition.

Therefore, in the present invention, the edge normal direction vector of the input image is normalized to a length of 1 in the input image processing part 200, as described later. According to this, the edge normal direction vector of the template image is normalized to 1 in length in the template image processing part 100.

As a result, the stability of pattern extraction is improved. Usually, it is desirable to have a normalization length of 1, but other constants can be used.

Concerning a trigonometric function, the following double size formula is established as is well known.

$$\cos(2\Theta) = 2\cos(\Theta)^2 - 1$$

$$\sin(2\Theta) = 2\cos(\Theta)\sin(\Theta) \qquad \text{Formula 6}$$

The evaluation vector generation unit 2 calculates the evaluation vector of the template image defined by the following formula 7.

Formula 7

When assumed to be a threshold (for fine edge removal), the evaluation vector $\vec{V}$ of the template image is:

if $|\vec{T}| \geq a$ $$\vec{V} = (V_X, V_Y) = \frac{1}{n}(\cos(2\alpha), \sin(2\alpha)) = \frac{1}{n}(2U_X^2 - 1, 2U_X U_Y)$$

else $\vec{V} = \vec{0}$ wherein n is the number of $\vec{T}$ when $|\vec{T}| \geq a$.

Formula 7 will be described. The reason why a vector smaller than constant "a" is set as a 0 vector is to remove a noise, for example.

Next, a description will be given of the fact that x and y components of this evaluation vector are each divided by "n" for normalization.

Generally, the shape of the template image is arbitrary, thereby leading to various edge shapes. For example, there is a situation in which the number of edges is small as shown in FIG. 8(a), or the number of edges is larger (than that of FIG. 8(a)) as shown in FIG. 8(b). Therefore, in this embodiment, the similarity is intended to be evaluated on the same scale by dividing it by "n" for normalization independent of whether the number of the edges is small or large.

However, the normalizing processing of dividing by "n" does not necessarily need to be performed. Normalizing processing may be omitted in a situation in which only one template image is used or in which only template images the same as the number of edges are used.

Next, a description will be given of the fact that the x and y components of Formula 7 serve as a subordination function of the cosine/sine for a double size of the x and y components of Formula 5.

If the inner product cos θ of an angle θ between an evaluation vector T of the template image and an evaluation vector I of the input image is used as a similarity scale as in the conventional technique, the following problem will arise.

For example, let us suppose that the template image is that of FIG. 7(a), and the input image is that of FIG. 7(b). In the background of FIG. 7(b), the left background part of an image of a specified object is brighter than the image of the specified object, and the right background part of the image of the specified object is darker than the image of the specified object.

If considered only from the images, the images of the specified object completely coincide with each other when the center of the template image of FIG. 7(a) coincides with the center of the input image of FIG. 7(b). Therefore the similarity value must be the maximum at this time. Herein, if the edge normal direction vector that is directed outward from the image of the object is positive, the edge normal direction vector must be directed in the same direction (outward/inward) in the brighter background part of FIG. 7(b) and in the darker background part thereof when deserving from the image of the specified object.

However, if the brightness of the background of FIG. 7(b) is uneven in the right and left background parts with the specified object are between these values at this time, the directions are opposed as shown by arrows in FIG. 7(b) (i.e., outward from the specified object in the brighter background part, and inward from the specified object in the darker background part). Originally, it is to reach the maximum similarity value. But the similarity value is not necessarily high in this case, and thereby a distorted perception is easily shaped.

A detailed description of the above problem is given with reference to FIG. 6. An angle between the evaluation vector T of the template image and the evaluation vector I of the input image is θ. Its inner product, i.e., cos θ, is used as a similarity value. The direction of the evaluation vector I of the input image has two possibilities, i.e., either I of FIG. 6 or I' precisely opposite thereto because of unevenness in brightness of the background that exists in the periphery of the image of the specified object, as described above.

Therefore, the inner product used as a similarity scale could have two products, i.e., cos θ and cos θ'. Herein, θ+θ'=π, and cos θ'=cos(π−θ)=−cos θ.

Therefore, if cos θ is used as the similarity scale, a similarity value will be oppositely reduced when there is a need to act properly to increase the similarity value, and the similarity value will be oppositely increased when there is a need to act properly to reduce the similarity value.

In other words, according to the prior art similarity value, matching between the template image and the input image cannot be correctly evaluated. As a result, disadvantageously, a wrong recognition value is easily formed by the conventional technique, and a recognition result is clear even if images have the same shape.

Therefore, in the present invention, a cosine that is double the size of θ, i.e., cos(2θ) is used for the formula of the similarity value. Thereby, cos(2θ')=cos(2θ) from the double size formula of Formula 6 even if cos θ'=−cos θ. In other words, the similarity value rises irrespective of the background when there is a need to act to increase the similarity value. Therefore, the matching therebetween is correctly evaluated in spite of the unevenness in brightness of the background. This applies to the quadruple size or the sextuple size as well as the double size.

Moreover, the properties of the similarity value monotonically decreasing with respect to angle θ do not change even if an even-numbered times angle cosine is used.

Therefore, according to the present invention, patterns are stably extracted by an even-numbered times angle evaluation regardless of the brightness condition of the background.

More specifically, the similarity value is defined by the following formula in the present invention.

Formula 8

Similarity value $$L(x, y) = \sum_i \sum_j K_X(x+i, y+j)V_X(i, j) + K_Y(x+i, y+j)V_Y(i, j)$$

$\vec{K}=(K_X, K_Y)$: Evaluation vector of input image $\vec{V}=(V_X, V_Y)$: Evaluation vector of template image Since Formula 8 consists only of addition and multiplication, the similarity value is linear for each evaluation vector of the input and template images. Therefore, when Formula 8 is subjected to Fourier transformation, Formula 9 is obtained by a discrete correlation theorem of Fourier transformation (reference: Fast Fourier Transformation translated by Hiroshi Miyakawa published by Science and Technology).

$$\tilde{L}(u,v) = \tilde{K}_X(u,v)\tilde{V}_X(u,v)^* + \tilde{K}_Y(u,v)\tilde{V}_Y(u,v)^* \quad \text{Formula 9}$$

$\tilde{K}_X, \tilde{K}_Y$: Fourier transformation values of Kx, Ky $\tilde{V}_X^*, \tilde{V}_Y^*$: Fourier transformation complex conjugate of Vx, Vy Hereinafter, Fourier transformation value represented as ~, and complex conjugate represented as *.

The similarity value of Formula 8 is obtained by subjecting Formula 9 to inverse Fourier transformation. From careful consideration of Formula 9, the following two respects will become apparent.

(1) First, the Fourier transformation value of the template image and the Fourier transformation value of the input image is simply multiplied together in a transformation value that has been subjected to orthogonal transformation.

(2) Secondly, the Fourier transformation value of the template image and the Fourier transformation value of the input image do not need to be simultaneously calculated. That is, the Fourier transformation value of the template image may be calculated prior to that of the input image.

Therefore, in this embodiment, the template image processing part 100 includes a recording unit 5 to record the output of a compression unit 4 before inputting the input image. Thereby, after the input image is received in the input image processing part 200, the template image processing part 100 is not required to process the template image. The processing performance is thus concentrated on processing subsequent to the input image processing part 200 and a multiplication unit 10, thus improving the processing speed.

Next, a description is given of a structure subsequent to the evaluation vector generation unit 2. As shown in FIG. 1, in the template image processing part 100, the evaluation vector of the template image that is output from the evaluation vector generation unit 2 is subjected to Fourier transformation by the orthogonal transformation unit 3, and is output to the compression unit 4.

The compression unit 4 compresses the evaluation vector that has been subjected to Fourier transformation, and stores it in the recording unit 5. As shown in FIG. 3, the evaluation vector subjected thereto includes various frequency components in both x and y directions. By experiments carried out by the present inventors, it is known that sufficient accuracy is obtained by processing the low frequency components (e.g., halves on the low frequency side in the x and y directions, respectively) without processing all of the frequency components. In FIG. 3, the range (−a≦x≦a, −b≦y≦b) having no oblique line is an original one. The range (−a/2≦x≦a/2, −b/2≦y≦b/2) having oblique lines is the one that has been compressed. That is, the processing amount is ¼ as much as before.

Thereby, an object to be processed is compressed, and the processing speed is improved.

The compression unit 4 and the recording unit 5 is omitted when a data amount is small, or when high-speed processing is not required.

Next, the input image processing part 200 will be described. The input image processing part 200 performs almost the same processing as the template image processing part 100. That is, according to Formula 2 and Formula 3, the edge extraction unit 6 outputs an edge normal direction vector of the input image defined by the following formula.

Formula 10

Edge normal direction vector of input image $$\vec{I} = (I_X, I_Y)$$

$I_x$: Derivative value of input image in x direction
$I_y$: Derivative value of input image in y direction The evaluation vector generation unit 7 inputs the edge normal direction vector of the input image from the edge extraction unit 6, and outputs an evaluation vector of the input image defined by the following two formulas.

Formula 11

Length normalized vector of input image $$\vec{J} = (J_X, J_Y) = \frac{\vec{I}}{|\vec{I}|}$$

Formula 12

When assumed to be a threshold (for fine edge removal), the evaluation vector $\vec{K}$ of the input image is:

if $|\vec{I}| \geq a$ $$\vec{K} = (K_X, K_Y) = (\cos(2\beta), \sin(2\beta)) = (2J_X^2 - 1, 2J_X J_Y)$$

else $$\vec{K} = \vec{0}$$

The input image processing part 200 differs from the template image processing part 100 only in the fact that normalizing processing of division by "n" is not performed. In other words, evaluation by the even-numbered times angle, the normalizing processing to 1 in length, and the noise removal processing are performed in the same way as in the template image processing part 100.

Next, a structure subsequent to the evaluation vector generation unit 7 will be described. As shown in FIG. 1, in the input image processing part 200, the evaluation vector of the input image that is output from the evaluation vector generation unit 7 is subjected to Fourier transformation by the orthogonal transformation unit 8, and is output to the compression unit 9.

The compression unit 9 compresses the evaluation vector that has been subjected to Fourier transformation, and outputs the result to the multiplication unit 10. Herein, the compression unit 9 compresses the object to be processed to the same frequency band as the compression unit 4 (e.g., halves on the low frequency side in the x and y directions, respectively, in this embodiment).

The compression unit 9 is, of course, omitted when the data amount is small, or when high-speed processing is not required, and the compression unit 9 is likewise omitted when the compression unit 4 is omitted in the template image processing part 100.

Next, the multiplication unit 10 and other construction subsequent to this will be described. When the processing in the template image processing part 100 and in the input image processing part 200 is completed, the multiplication unit 10 inputs a Fourier transformation value of each evaluation vector of the template and inputs images from the recording unit 5 and the compression unit 9.

Thereafter, the recording unit 5 performs a product-sum-calculation according to Formula 9, and outputs the result (i.e., the Fourier transformation value of the similarity value L) to an inverse orthogonal transformation unit 11.

The inverse orthogonal transformation unit 11 subjects the Fourier transformation value of the similarity value L to inverse Fourier transformation, and outputs the map L(x,y) of the similarity value L to a map processing unit 12. The map processing unit 12 extracts a high-value point (peak) from the map L(x,y), and outputs its position and its value. The map processing unit 12 and the construction subsequent to this is freely arranged if necessary.

Next, a processing example by the template image of FIG. 2 will be described with reference to FIG. 4 and FIG. 5. If the input image is as shown in FIG. 4(*a*), the edge extraction unit 6 extracts an edge component in the x direction as shown in FIG. 4(*b*), and extracts an edge component in the y direction as shown in FIG. 4(*c*).

As a result of the aforementioned processing, a similarity value map L(x,y) shown in FIG. 5(*a*) is obtained. Herein, the front end of the arrow indicated as the "maximum value" is a peak of this map, and, as is apparent from a comparison with the input image of FIG. 5(*b*), it is understood that the correct point is clearly recognized at only one point.

In the conventional technique, the calculation must be performed by the number of times of the product, i.e., 2AB in order to successively scan the template image on input images and to obtain $\rho_{y0}$ Formula 1 at each position, wherein the size of the input image is $A(=2^\gamma)$ and the size of the template image is B. Herein, the number of calculations is evaluated by the number of times of the product with high calculation costs.

In contrast, in this embodiment, FFT is performed twice by the orthogonal transformation unit 3 and 8, the product sum calculation is then performed by the multiplication unit 10, and inverse FFT is performed once by the inverse orthogonal transformation unit 11. The number of calculations is merely the number of times of the product of $3\{(2\gamma-4)A+4\}+2A$.

In a comparison of the number of calculations therebetween, the number of calculations of the product according to this embodiment is about 1/100 of the number of calculations of the product according to the conventional technique, if $A=256 \times 256=2^{16}$, and $B=60 \times 60$. As a result, unusually high-speed processing is carried out.

The discrete correlation theorem of Fourier transformation cannot be used in such a nonlinear formula as Formula 1 of the conventional technique. Therefore, in the conventional technique, processing for the template image cannot be performed prior to that for the input image as shown in FIG. 1 of this embodiment. In other words, in the conventional technique, both the template image and the input image must be processed simultaneously. Also in this respect, the processing speed in this embodiment is higher than that in the conventional technique.

(Embodiment 2)

Figure 9:
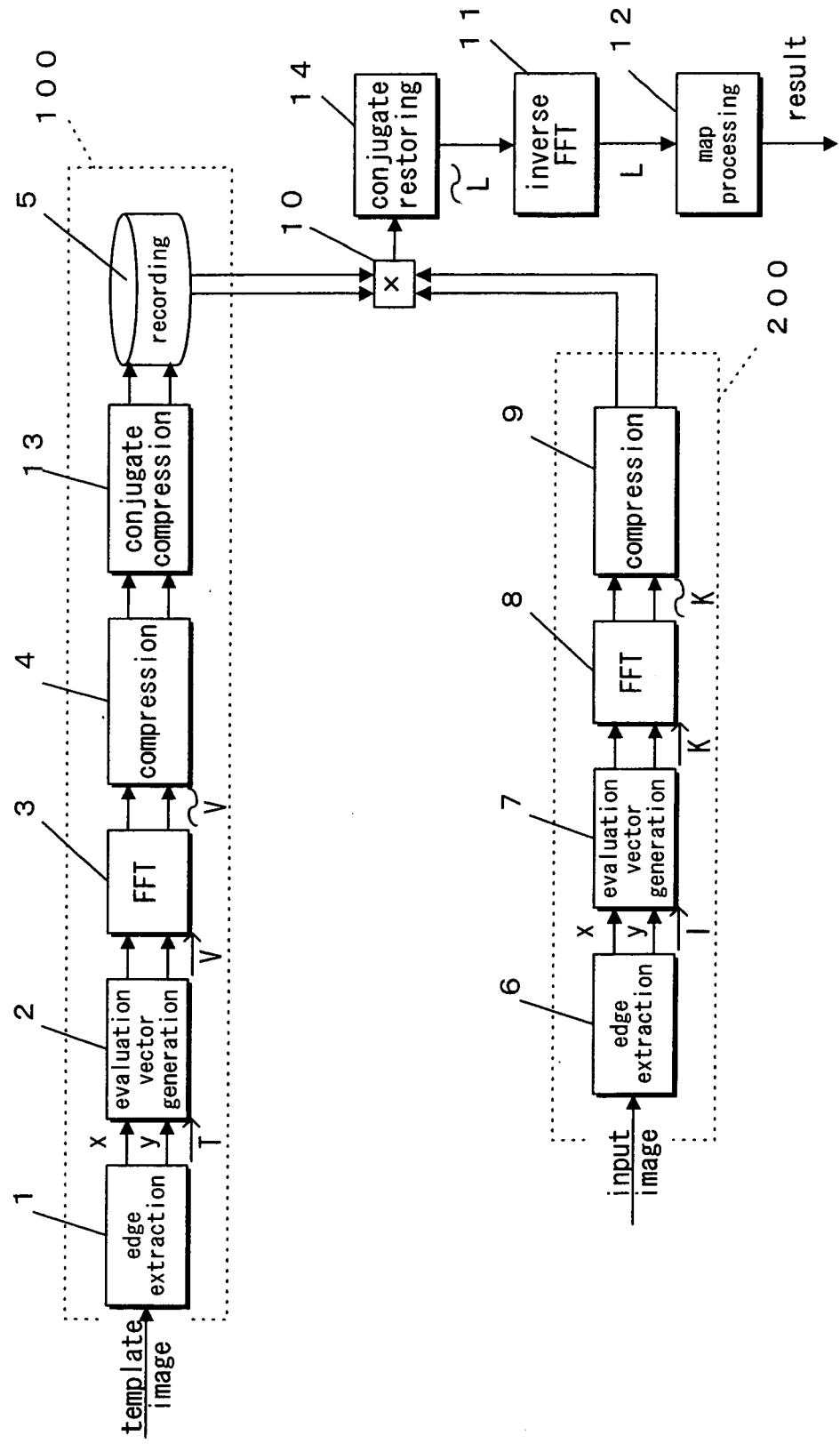
FIG. 9 is a block diagram of an image processing apparatus according to Embodiment 2 of the present invention.

In this embodiment, a conjugate compression unit 13 and a conjugate restoring unit 14 are added to the elements of FIG. 1 as shown in FIG. 9. The conjugate compression unit 13 further halves the Fourier transformation value of the evaluation vector of the template image that has been read from the recording unit 5 by use of complex conjugate properties of Fourier transformation.

This respect will be described. The following formula is established for the spectrum obtained by real number Fourier transformation.

$$\tilde{A}(u,v) = \tilde{A}(-u,-v)^* \quad \text{Formula 13}$$

Figure 10A:
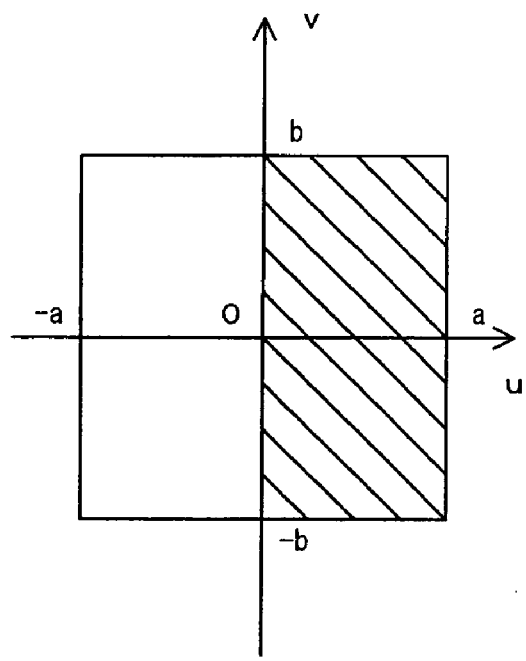
FIGS. 10(a) and 10(b) are graphs showing conjugate properties.
Figure 10B:
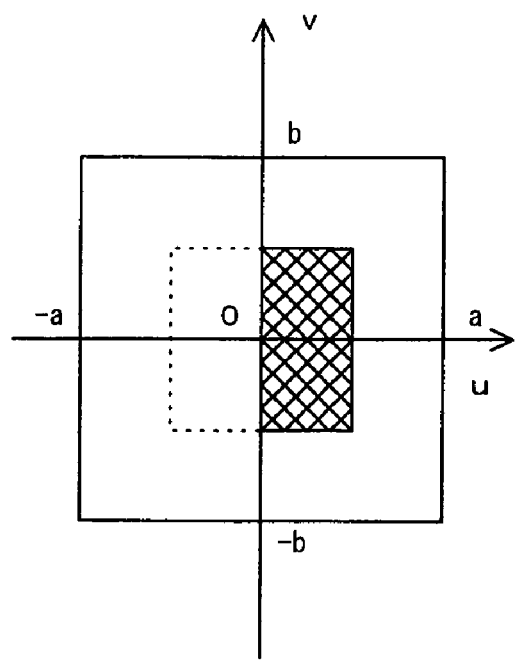

In detail, a spectral value at a specific point is equal to the complex conjugate of a spectral value at a position symmetrical to that point in a uv coordinate system. Use of this property makes it possible to reduce the processing amount by half of the uv coordinate system as shown in FIG. 10(a). Since the compression unit 4 and the compression unit 9 further compress it, the data amount is reduced to ⅛ of the original data as shown in FIG. 10(b). Therefore, the processing speed is improved, and memory capacity is saved.

As a result, in this embodiment, the Fourier transformation value that the conjugate compression unit 13 has read from the recording unit 5 is halved, and is output to the multiplication unit 10. Thereafter, the conjugate reconstruction unit 14 performs processing by which the output from the multiplication unit 10 is doubled, and outputs the result to the inverse orthogonal transformation unit 11.

These constitute the basis of the present invention. A useful technique will be hereinafter disclosed by application of this basis.

(Embodiment 3)

In this embodiment, a first example and a second example will be described. A technique for performing face extraction by using an enlarged/reduced template image is disclosed in both examples. According to this technique, processing by use of similar templates different in size is carried out efficiently and at high speed. The application of this technique is not limited to face extraction.

FIRST EXAMPLE

Figure 11A:
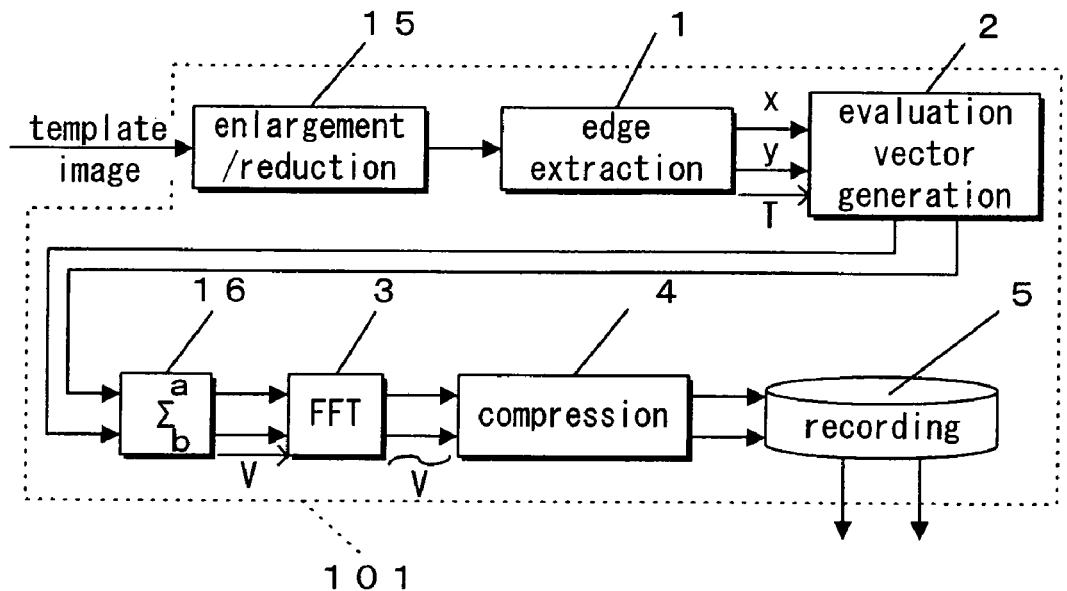
FIG. 11(a) is a block diagram of a template image processing part according to Embodiment 3 (first example) of the present invention.

FIG. 11(a) is a block diagram of a template image processing part 101 according to Embodiment 3 (first example) of the present invention. Some modifications have been made to the template image processing part 100 of FIG. 1 or FIG. 9 as shown in the figure.

First, when a template image is input to the template image processing part 101, the image is enlarged/reduced by a enlargement/reduction unit 15. Thereafter, the enlarged/reduced template image is output to an edge extraction unit 1.

When an evaluation vector generation unit 2 outputs the evaluation vector of the template image, an addition unit 16 applies addition processing to this. The data obtained by the addition processing is output to an orthogonal transformation unit 3.

The addition unit 16 performs addition processing for each size range according to the following formula.

Formula 14

Evaluation Vector of Template Image $$\vec{V} = (V_X(x,y), V_Y(x,y))$$

$$V_X(x, y) = \sum_{i=a}^{b} V_{Xi}(x, y)$$

$$V_Y(x, y) = \sum_{i=a}^{b} V_{Yi}(x, y)$$

wherein the size range is a b.

Although image processing is carried out using one template image in Embodiments 1 and 2, templates with multiple sizes may be processed using a plurality of templates in this embodiment.

Moreover, the sizes of the templates are separated into specific ranges, and a template processing result is superimposed thereon.

Referring now to FIG. 12, an example of an input image includes the face image of a person. In this example, a template image of a straight face, such as that of FIG. 13(a), is prepared. A template image of a face inclined at a specific angle as shown in FIG. 13(d) is also prepared. The degree to which the face to be prepared is inclined is appropriately selected.

When the edges of the template images of FIGS. 13(a) and 13(d) are extracted, appearances shown in FIG. 13(b) and 13(e), respectively, are obtained in this embodiment. Further, when the image of FIG. 13(a) or 13(d) is input, an evaluation vector corresponding to the edge image is generated as shown in FIG. 13(c) or 13(f).

As in Embodiments 1 and 2, data concerning the template images are stored in the recording unit 5.

When the input image is received, a procedure subsequent to those of the input image processing part 200 and the multiplication unit 10 is performed in the same way as in Embodiments 1 and 2.

Figure 14:
FIG. 14 is a view showing a face extraction result.

Corresponding similarity value maps are calculated for superimposed template data of all size ranges of the template images. A detection result, such as that shown in FIG. 14, is obtained. As is apparent from FIG. 14, not only the overall position of the face but also its size and the positions of the main face parts, such as the eyes, nose, and mouth, are recognized.

At this time, it is desirable to display the processing result on a display or to output it to a printer as shown in FIG. 14 in the stage subsequent to the map processing unit 12.

According to First Example, the following effects are obtained:

(1) Even if template data in a specific size range is added, and image processing is performed with layered templates, a part similar to the template often shows a high similarity value. Therefore, when similarity values of all sizes are calculated, the processing of the product sum calculation part and the processing of the inverse orthogonal transformation part must be repeatedly performed NM times, wherein N is the number of templates, and M is the number of sizes. On the other hand, the number of processings reaches NM/H by use of the superimposed template, wherein H is the width of a superimposed range. Therefore, improvements in efficiency is accomplished, and image processing is carried out at a higher speed for face extraction, for example.

(2) Additionally, a rough candidate range of eyes, nose, and mouth are extracted not only merely by outputting the positional data for a face but also by superimposing the template on the face candidate position as shown in FIG. 14.

The positions of face parts, such the eyes, nose, and mouth, can also be more accurately extracted by processing the images in these ranges much more finely, as described in the following embodiments.

SECOND EXAMPLE

Figure 11B:
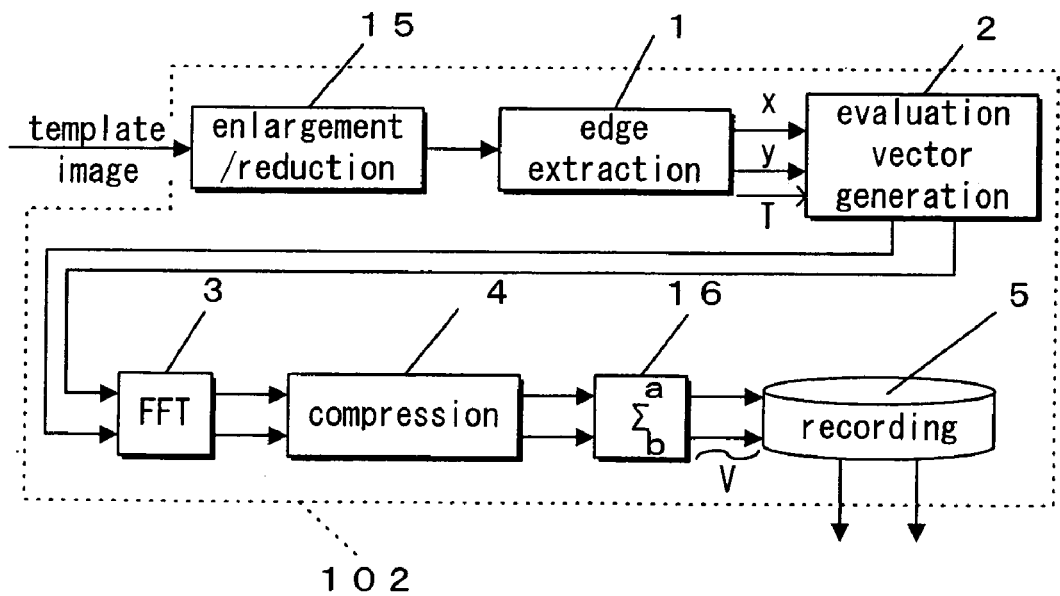
FIG. 11(b) is a block diagram of a template image processing part according to Embodiment 3 (second example) of the present invention.

In this example, a template image processing part 102 is constructed as shown in FIG. 11(b). That is, compared to the First Example, the position of the addition unit 16 is moved between the compression unit 4 and the recording unit 5. Thereby, the addition unit 16 performs addition processing according to the following formula 15.

$$\tilde{V}_X(u, v) = \sum_{i=a}^{b} \tilde{V}_{Xi}(u, v)$$

$$\tilde{V}_Y(u, v) = \sum_{i=a}^{b} \tilde{V}_{Yi}(u, v)$$

Formula 15 wherein the size range is a b.

The similarity value formula that is linear before being subjected to Fourier transformation is still linear after being subjected thereto. Therefore, the position of the addition unit 16 can be changed from the First Example to the Second Example, for example.

Thereby, an object to be processed by the addition unit 16 is reduced more than in the First Example because the object is compressed by compression unit 4. Therefore, processing speed is improved.

(Embodiment 4)

Figure 15:
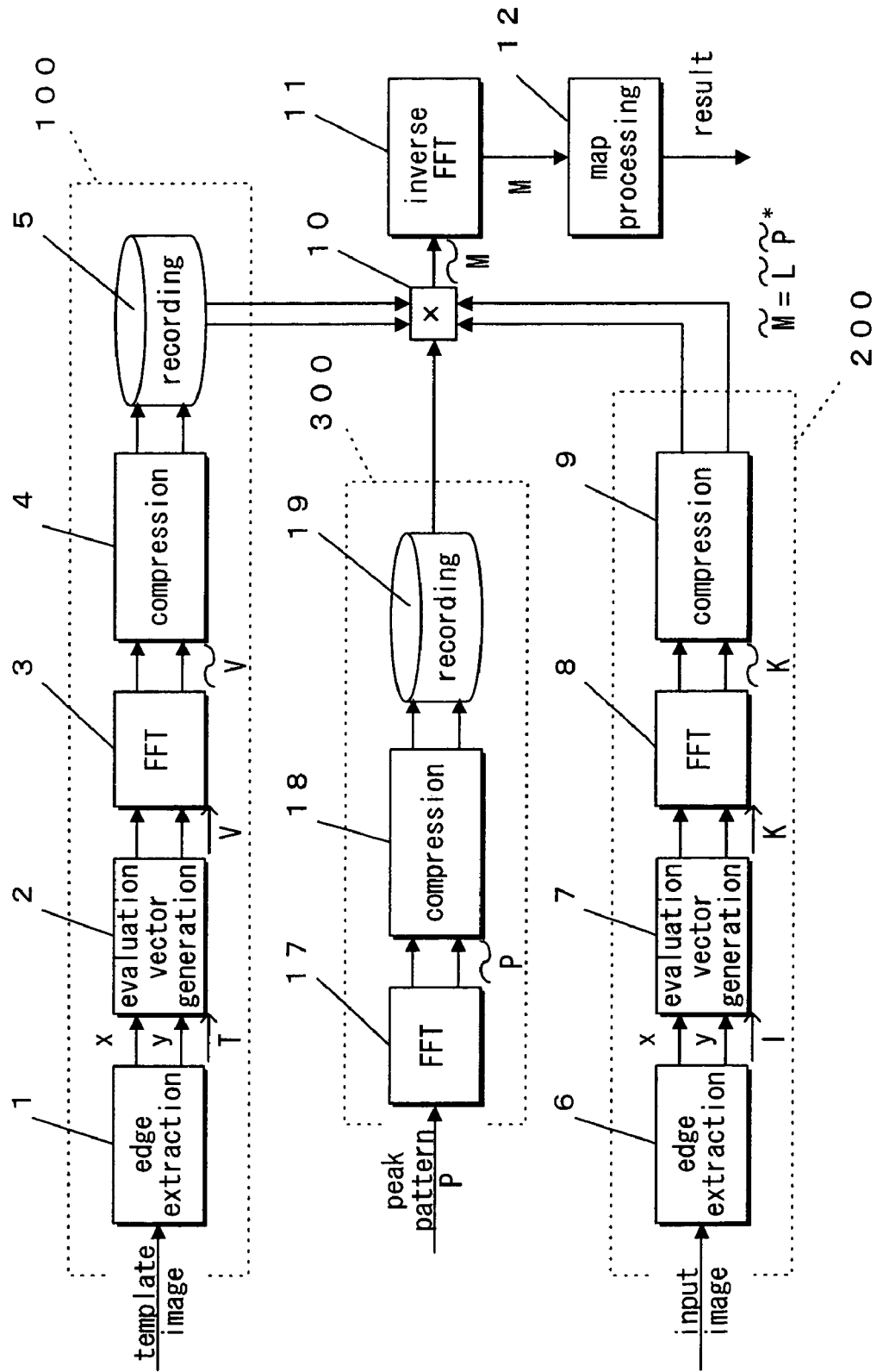
FIG. 15 is a block diagram of an image processing apparatus according to Embodiment 4 of the present invention.
Figure 16:
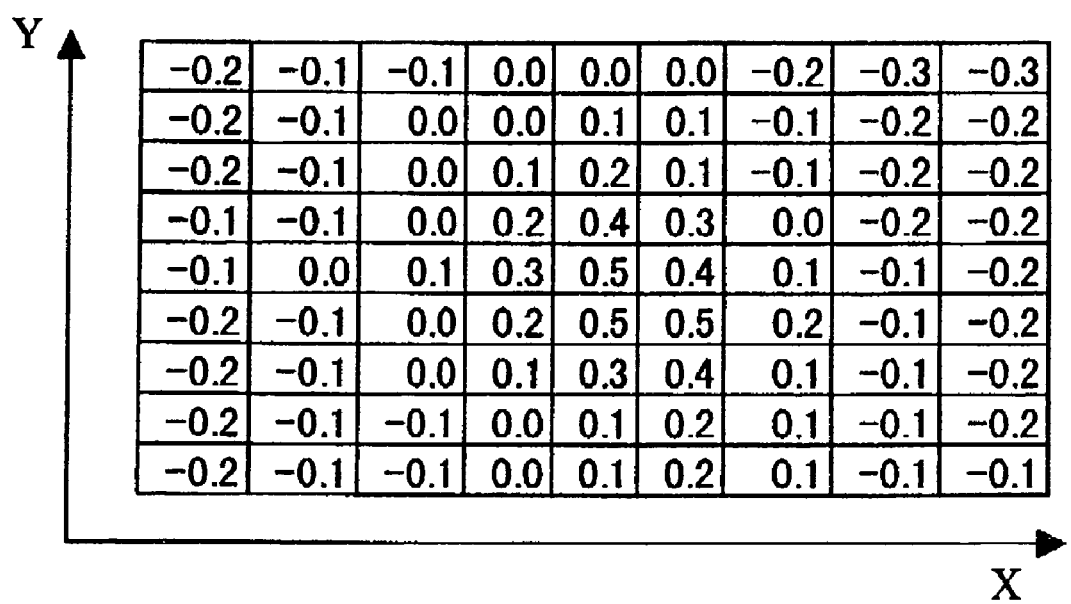
FIG. 16 is a view showing a peak pattern.

Referring now to FIGS. 15 and 16, Embodiment 4 discloses an efficient technique for enhancing the value of the maximum point of the similarity value map described in embodiments 1 and 2 into a stronger peak value.

Generally, in the similarity value map, a peak appears in a part overlapping the template image. In this embodiment, a peak pattern "p" around and including a maximum point is used as a filter for the similarity value map. The value of a part similar to the peak pattern in the similarity value map is amplified.

As shown in FIG. 15, in this embodiment, a peak pattern processing part 300 is added to the structure of FIG. 1 showing embodiment 1.

FIG. 16 shows a mask for this peak pattern. As indicated in FIG. 16, in this peak pattern, normalization is made to set an average value at 0.

In the peak pattern processing part 300, an orthogonal transformation unit 17 subjects this peak pattern to Fourier transformation, and a compression unit 18 compresses a Fourier transformation value before recording compressed data in a recording unit 19.

Since a mask is used, the similarity value formula is established not by Formula 8 but by the following formula 16 that reflects the mask.

Formula 16

$$\tilde{V}_X(u, v) = \sum_{i=a}^{b} \tilde{V}_{Xi}(u, v)$$

$$\tilde{V}_Y(u, v) = \sum_{i=a}^{b} \tilde{V}_{Yi}(u, v)$$

wherein the size range is a b.

$$\tilde{M}(u,v) = \tilde{L}(u,v)\tilde{P}^*$$

$\tilde{P}$: Peak pattern low frequency spectrum
L(u,v): Similarity value before filtering
M(u,v): Similarity value after filtering The multiplication unit 10 reads data from the recording unit 5, the recording unit 19, and the compression unit 9, then performs a product-sum-calculation, and outputs the Fourier transformation value of the similarity value corrected by the peak pattern.

A peak pattern filter can filter the similarity value map L according to the following formula, but, if so, a large amount of product sum calculations will be inefficiently needed.

$$M(x, y) = \sum_{l} \sum_{m} p(l, m) L(x, l, y + m)$$

Formula 17

In contrast, in this embodiment, simple, accurate processing is performed according to Formula 16 without performing a large amount of calculations like Formula 17.

Therefore, according to this embodiment, the peak point of the similarity value map is efficiently amplified. Additionally, a part similar to the template is clearly and stably detected from the input image while reflecting the peak pattern.

(Embodiment 5)

In this embodiment, a pixel mean in the range of the template image as well as the similarity value between the edge of the input image and the edge of the template image is added to a similarity judgment.

Figure 17:
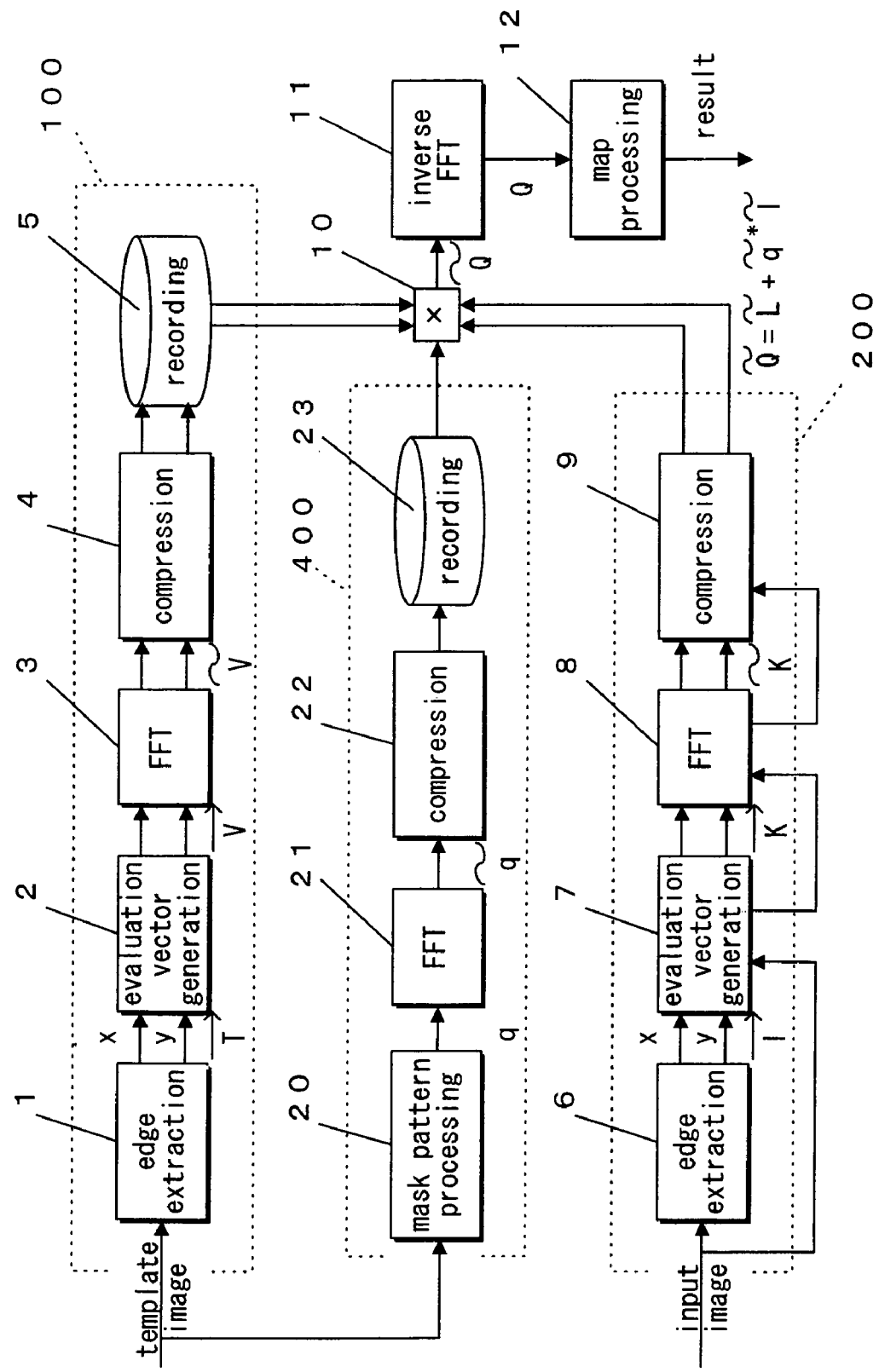
FIG. 17 is a block diagram of an image processing apparatus according to Embodiment 5 of the present invention.

This structure is shown in FIG. 17. Like FIG. 15, a mask pattern processing part 400 is added to the structure of FIG. 1 of Embodiment 1.

However, the structure of FIG. 17 differs from that of FIG. 15 in that the mask pattern processing part 400 is used, not to input a peak pattern, but to input a template image. Also, a mask pattern generation unit 20 is provided for generating a mask pattern that depends on this image.

Like FIG. 15, the output of the mask pattern generation unit 20 is subjected to Fourier transformation by the orthogonal transformation unit 21. The result is then compressed by the compression unit 22, and the compressed data is recorded in the recording unit 23.

Further, since a mask is used, the similarity value formula is expressed not as Formula 8 but as the following formula that reflects the mask.

$$Q(x, y) = L(x, y) + \sum_{l} \sum_{m} q(l, m) I(x + l, y + m)$$

Formula 18

Q(x,y): Pixel-average-added similarity value
q(l,m): Mask pattern
L(x,y): Similarity value before filtering
I(x,y): Input image data For the same reason mentioned in Embodiment 4, a large amount of product sum calculations is inefficiently needed if multiplication is performed in this way.

Formula 19 is obtained by subjecting this to Fourier transformation, whereby the calculation is performed very simply.

$$\tilde{Q}(u,v) = \tilde{L}(u,v) + \tilde{q}^*(u,v)\tilde{I}(u,v)$$

Formula 19

The multiplication unit 10 performs a product-sum-calculation according to Formula 19.

Next, the relationship between the template image and the mask pattern is described with reference to FIG. 18. Herein, in order to add a pixel mean in the range of the template image to a similarity judgment, the mask pattern generation unit 20 generates a mask pattern as shown in FIG. 18(*b*) for a template image as shown in FIG. 18(*a*)

Figure 18A:
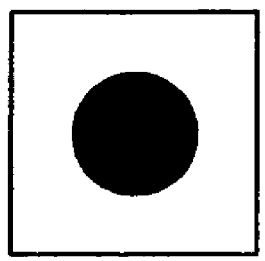
FIG. 18(a) is a view showing a template image.
Figure 18B:
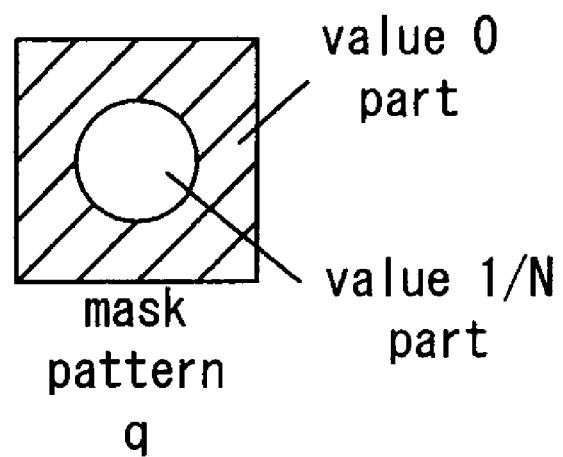
FIG. 18(b) is a view showing a mask pattern.

In greater detail, in the template image of FIG. 18(a), a value of 1/N is set at each point of the inner part (inside the circle) whose pixel mean is to be calculated, and a value of 0 is set at all other points. N is the number of points in the inner part, and the result of addition of the values of all points of the mask pattern is 1.

According to this embodiment, a mean of pixel values inside the image can also be added to the similarity value, and a specified object is extracted from the input image more accurately and more efficiently.

A mean of a square value of each pixel is calculated such that data in which each pixel of the input image is squared by the input image processing part is formed, and the same processing is applied thereto.

Therefore, a distributed value as well as a mean within a range is efficiently calculated.

(Embodiment 6)

Figure 19:
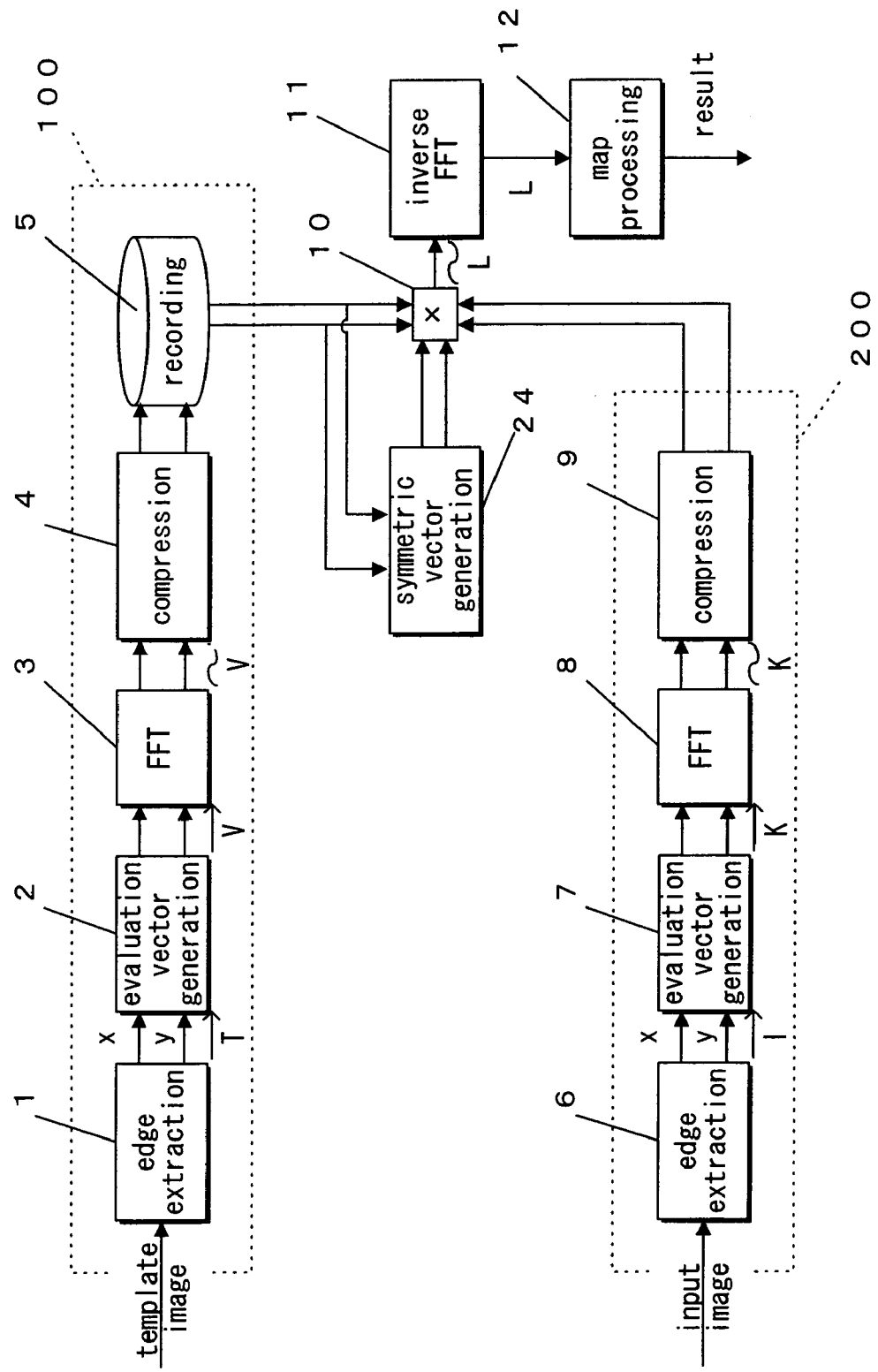
FIG. 19 is a block diagram of an image processing apparatus according to Embodiment 6 of the present invention.

Referring to FIG. 19, Embodiment 6 discloses a technique by which a bilaterally symmetric image with respect to a template image is efficiently processed. In addition to the structure of FIG. 1 of Embodiment 1, a symmetric vector generation unit 24 is provided between the recording unit 5 and the multiplication unit 10. As in Embodiment 1, Formula 8 is used as the similarity value formula in this embodiment.

Figure 20A:
FIG. 20(a) is a view showing an original template image.

Referring now to FIG. 20(a), a description is given of how to treat a bilaterally symmetric template image. For example, if the template image of FIG. 20(a) is an original image, a template image in which the original image has been bilaterally reversed is shown as in FIG. 20(b).

The relationship between the edge normal direction vectors of these template images is expressed by the following formula 20.

Formula 20

Edge normal direction vector of image resulting from subjecting original template image to bilateral reversal $$\vec{T}'=(T'x(x,y), T'y(x,y))$$

$$T'x(x,y)=-Tx(-x,y)$$

$$T'y(x,y)=Ty(-x,y)$$

The evaluation vector of the template image that has been bilaterally reversed is expressed by the following formula 21.

$$\vec{W}=(Wx(x,y), Wy(x,y)): \text{Evaluation vector of } \vec{T}'$$

$$\vec{V}=(Vx(x,y), Vy(x,y)): \text{Evaluation vector of } \vec{T}$$

$$Wx(x,y)=2T'x^2-1=2(-Tx(-x,y))^2-1=2Tx(-x,y)^2-1=Vx(-x,y)$$

$$Wy(x,y)=2T'xT'y=2(-Tx(-x,y))Ty(-x,y)=-2Tx(-x,y)Ty(-x,y)=-Vy(-x,y) \quad \text{Formula 21}$$

Concerning Fourier transformation, because of the relation of Formula 22, Formula 23 is obtained by applying Formula 22 to Formula 21.

$$f(x)=g(-x) \rightarrow \tilde{f}(u)=\tilde{g}(-u) \quad \text{Formula 22}$$

$$\tilde{W}_X(u,v)=\tilde{V}_X(-u,v)$$

$$\tilde{W}_Y(u,v)=-\tilde{V}_Y(-u,v) \quad \text{Formula 23}$$

In detail, the evaluation vector of the template image that has been bilaterally reversed is easily generated by, for example, reversing the positive and negative of the evaluation vector of the original template image.

Therefore, the evaluation vector of the template image that has been bilaterally reversed is obtained merely by allowing the symmetric vector generation unit 24 to apply Formula 23 to the evaluation vector of the original template image of the recording unit 5 in FIG. 19.

Figure 20B:
FIG. 20(b) is a view showing a template image that has been subjected to a bilateral reversal.

When simply assumed, there is no need to perform complex processing, such as a procedure in which the image of FIG. 20(b) is generated from the image of FIG. 20(a), and the evaluation vector is again calculated from the image of FIG. 20(b).

Thereby, the evaluation vector of the template image that has been bilaterally reversed is generated without direct calculations, and processing speed is improved. Additionally, recording capacity is saved because the need to purposely store the template image that has been bilaterally reversed is obviated.

(Embodiment 7)

Referring now to FIG. 22(b), in embodiment 7, eye/eyebrow extraction processing is added to the face extraction processing described in Embodiment 3. Eyes/eyebrow candidate range is roughly extracted from the input image of FIG. 22(a) according to the processing described in Embodiment 3.

Point biserial correlation coefficient filters shown in FIG. 23(a) through FIG. 23(d) are applied to each point of the image of this eye/eyebrow candidate range, a map of point biserial correlation values is then formed. Points where the correlation value in the map are high are set as an eye center point 3002 and as an eyebrow center point 3003, respectively.

The point biserial correlation coefficient η is defined by the following formula (reference; Multivariate Analysis Handbook, page 17, Modern Mathematics).

$$\eta = \frac{\overline{x_1} - \overline{x_2}}{S}\sqrt{\frac{n_1}{n}\left(1-\frac{n_1}{n}\right)} \quad \text{Formula 24}$$

Overall range: addition of 1st range to 2nd range
$n_1$: Number of pixels of 1st range
$n$: Number of pixels of overall range
$\overline{x_1}$: Average brightness level of 1st range
$\overline{x_2}$: Average brightness level of 2nd range
$S$: Standard deviation of overall range
Value in $\sqrt{}$ is constant when mask size is fixed.

FIG. 23(a) through FIG. 23(d), FIG. 23(a) show the positional relationships of all ranges. FIG. 23(b) shows an overall range mask. FIG. 23(c) shows a 1st range mask. FIG. 23(d) shows a 2nd range mask.

If the filter shape according to this point biserial correlation coefficient is formed as shown in FIG. 23(a), it is expected that the eyebrow center 3002 and the eye center 3003 are extracted as shown in FIG. 22(c).

Next, filter processing according to the point biserial correlation coefficient will be described.

First, main components of Formula 24 are expressed by the following formula 25.

$$\overline{x_1}=\Sigma I(x+i, y+j)M1(i, j)$$

$$\overline{x_2}=\Sigma I(x+i, y+j)M2(i, j)$$

$$\overline{x}=\Sigma I(x+i, y+j)Ma(i, j)$$

$$\overline{x^2} = \Sigma J(x+i, y+j) Ma(i, j) \quad \text{Formula 25}$$

wherein $$J(x, y) = I^2(x, y)$$

$$\overline{x_1} - \overline{x_2} = \Sigma I(x+i, y+j)(M1(x,y) - M2(x,y))$$

M1: 1st range mask
M2: 2nd range mask
Ma: Overall range mask
I(x,y): Each pixel value of input image The following formulas 26–28 are obtained by subjecting each component to Fourier transformation.

$$(\tilde{\overline{x_1}} - \tilde{\overline{x_2}}) = \tilde{I}(\tilde{M}_1 - \tilde{M}_2)^* \quad \text{Formula 26}$$

$$\tilde{\overline{x}} = \tilde{I}\tilde{M}_a^* \quad \text{Formula 27}$$

$$\tilde{\overline{x^2}} = \tilde{J}\tilde{M}_a^* \quad \text{Formula 28}$$

wherein $$J(x, y) = I^2(x, y)$$

Figure 21:
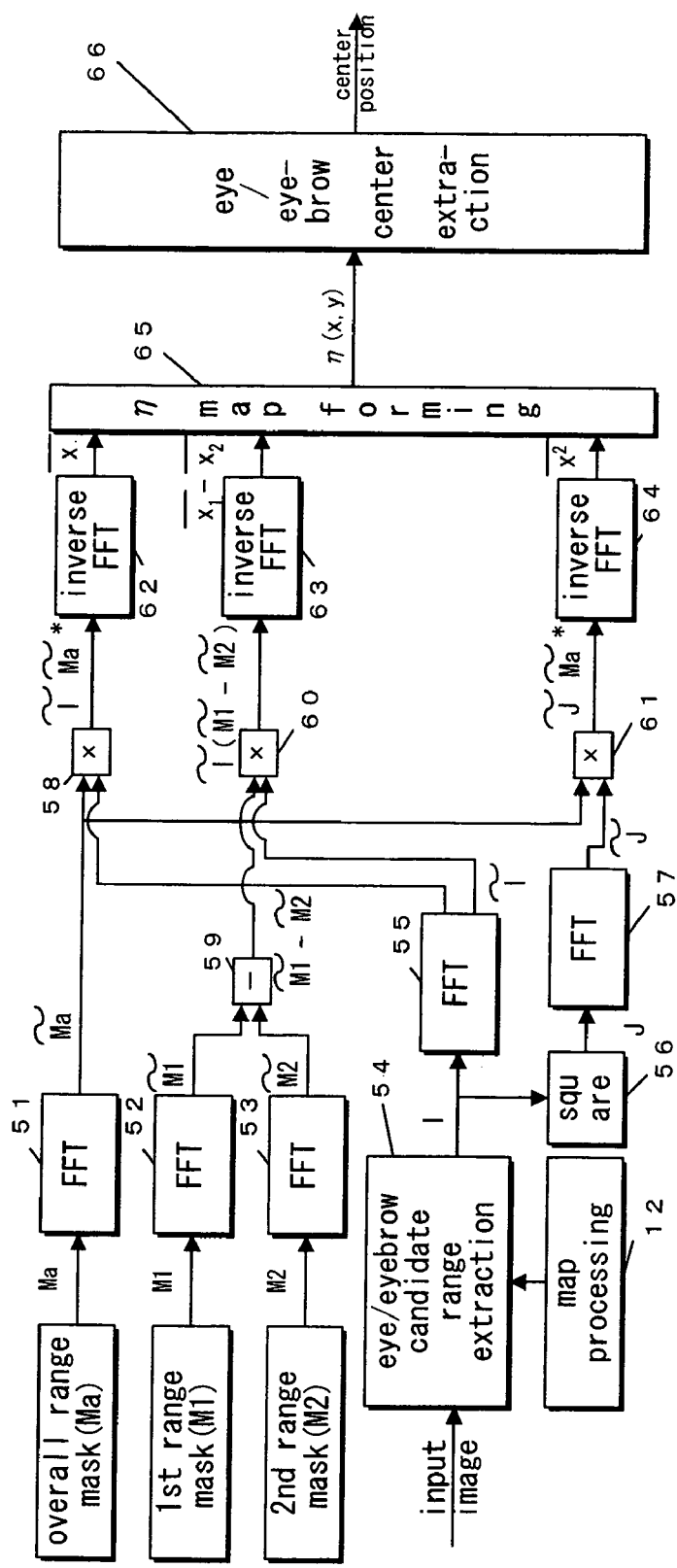
FIG. 21 is a block diagram of a part of the image processing apparatus according to embodiment 6 of the present invention.

In order to perform these processings, the structure of FIG. 21 is formed, for example. First, each mask of the overall range, the 1st range, and the 2nd range is subjected to Fourier transformation by the orthogonal transformation unit 51 through 53.

An input image and a result of the face extraction described in Embodiment 3 are input to the eye/eyebrow candidate range extraction unit 54 through the map processing unit 12. Based on these inputs, the eye/eyebrow candidate range extraction unit 54 extracts only the eye/eyebrow candidate range shown in FIG. 22(b) from FIG. 22(a). Data concerning this eye/eyebrow candidate range is subjected to Fourier transformation by an orthogonal transformation unit 55 without any changes. The result is then squared by a square unit 56, and is subjected to Fourier transformation by an orthogonal transformation unit 57.

Thereafter, data shown in Formula 27 is input through a multiplication unit 58 to an inverse orthogonal transformation unit 62 precedent to a η map forming unit 65. Likewise, data shown in Formula 26 is input to an inverse orthogonal transformation unit 63 through a multiplication unit 60, and data shown in Formula 28 is input to an inverse orthogonal transformation unit 64 through a multiplication unit 61. The input data is subjected to inverse Fourier transformation by the inverse orthogonal transformation unit 62 through 64, and is output to the η map forming unit 65.

Thereafter, the η map forming unit 65 performs a calculation according to Formula 24 when receiving the data from the inverse orthogonal transformation unit 62 through 64, and outputs a map η(x,y) of the point biserial correlation coefficient.

The eye/eyebrow center extraction unit 66 extracts two points having high values from the map η(x,y) output by the η map forming unit 65, and outputs them as the eyes center and an eyebrow center, respectively.

In this structure, multiplication must be performed roughly 15×15×N=225N times, wherein "15×15" (pixels) is the filter size of FIG. 23(a), and N is the number of pixels of the input image.

In contrast, according to this embodiment, the number of product calculations is roughly N+[(2γ−4)N+4]×5+12N+N+N=5N(2γ−1)+20 times. For convenience, the calculation of "$\sqrt{\ }$" is assumed to be equal to one multiplication processing.

That is, (calculation amount of this embodiment)<(calculation amount of the conventional technique) under the condition that γ is 22 or less.

Usually, a huge image in which N is 222 or more is not used. Therefore, it is understood that the image processing of this embodiment is smaller in the number of calculation times than that of the conventional processing, and is performed faster than that of the conventional processing.

Thus, according to this embodiment, the point biserial correlation coefficient filter processing is more efficiently performed.

The positions of other face parts, such as eye corners, mouth edges, nostrils, and irises, are calculated by variously changing the masks shown in FIG. 23(a) through FIG. 23(d).

(Embodiment 8)

This embodiment discloses a technique for expanding the function of the face extraction according to Embodiment 3 and extracting a mouth range, which is a facial organ, from a face image.

Figure 25A:
FIG. 25(a) is a view showing an input image.
Figure 25B:
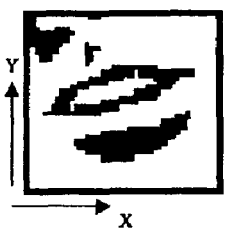
FIG. 25(b) is an explanatory drawing of a mouth candidate range.

As described in Embodiment 3 with reference to FIG. 14, a mouth candidate range shown in FIG. 25(b) is extracted from the input image of FIG. 25(a).

Figure 25C:
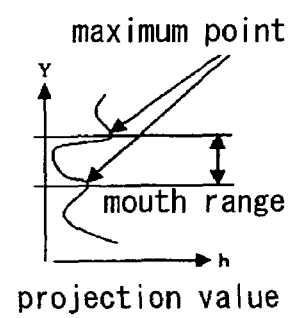
FIG. 25(c) is a graph of projection values.

When the extracted mouth candidate range is projected onto the Y-axis (i.e., when the total h of pixel values is plotted along the X-axis), a graph roughly shown in FIG. 25(c) is obtained.

The total h is defined by the following formula 29.

Formula 29

$$h(x, y) = \sum_{i=x-w/2}^{x+w/2} I(x+i, y)$$

Figure 25D:
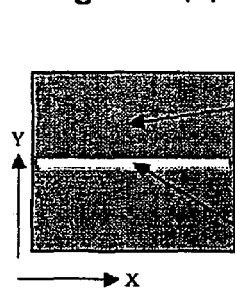
FIG. 25(d) is an explanatory drawing of a mask pattern.
Figure 25E:
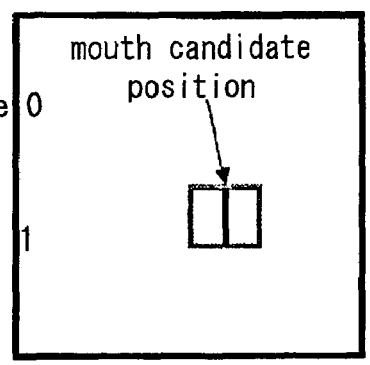
FIG. 25(e) is a view showing a projection-value map image.
Figure 25F:
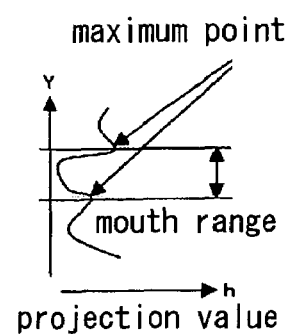
FIG. 25(f) is a graph of projection values.

I(x,y): Each pixel value of input image
w: Width of mouth candidate range
h(x,y): Projection value In order to efficiently obtain this total by use of orthogonal transformation, a mask shown in FIG. 25(d) is prepared. Formula 29 is rewritten like the following formula 30, including this mask.

$$h(x, y) = \sum_{i=x-w/2}^{x+w/2} I(x+i, y) = \sum_{i,j} m(i, j) I(i+x, j+y) \quad \text{Formula 30}$$

m: Mask

When this is subjected to Fourier transformation, the following formula 31 is obtained.

$$\tilde{h}(u,v) = \tilde{m}(u,v)^* \tilde{I}(u,v) \quad \text{Formula 31}$$

That is, this projection value is obtained by subjecting the input image and the mask pattern to Fourier transformation, thereafter performing the calculation of Formula 31, and subjecting the result to inverse Fourier transformation. Thereby, the map "h(x,y)" of the projection value "h" is obtained.

Figure 24:
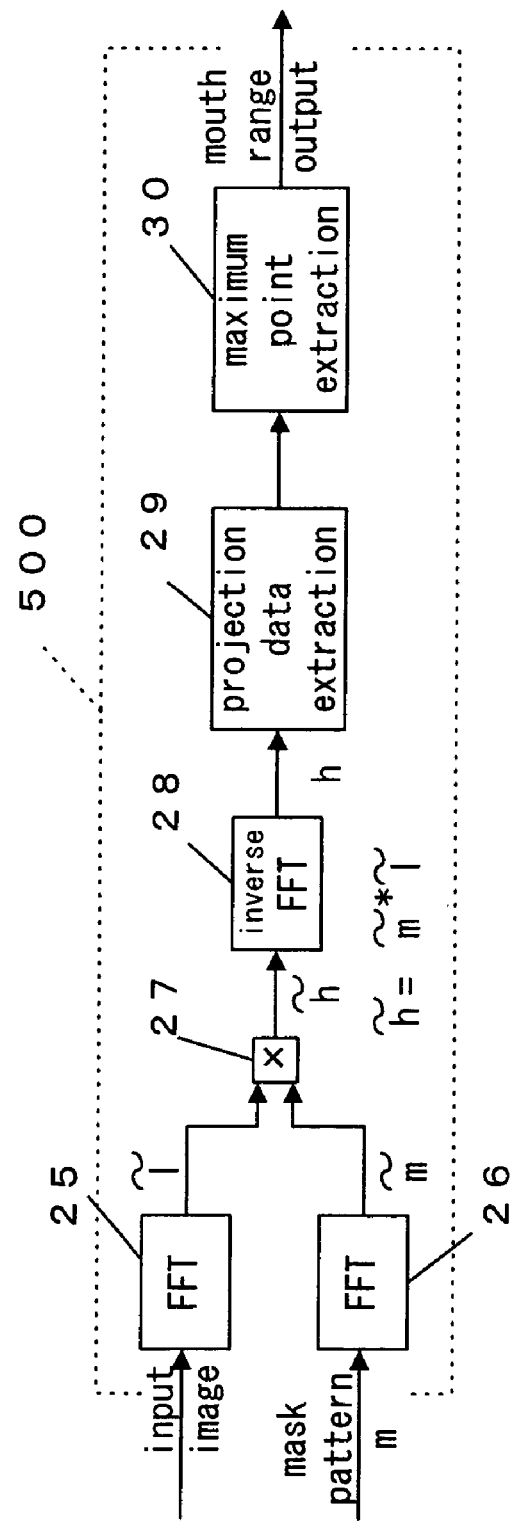
FIG. 24 is a block diagram of a part of an image processing apparatus according to Embodiment 8 of the present invention.

From the above result, it is desirable to form the structure of FIG. 24, for example. As shown in FIG. 24, the input image and the mask pattern are subjected to Fourier transformation by the orthogonal transformation unit 25 and 26, respectively.

Thereafter, the transformation value is multiplied by the multiplication unit 27, and is subjected to inverse Fourier transformation by the inverse orthogonal transformation unit 28. As a result, the map h(x,y) of the projection value is obtained.

The obtained map h(x,y) is developed by a projection data extraction unit 29. A maximum point extraction unit 30 calculates two maximum points from this map, and outputs the range between these maximum points as mouth range.

The mask pattern is, of course, beforehand subjected to Fourier transformation as in Embodiment 1, and, if so, processing performance is concentrated on the processing of the input image, so that processing speed is improved.

According to this embodiment, the position of the mouth, which is a facial organ, (more specifically, the positions of both the upper and lower lips) is accurately calculated.

(Embodiment 9)

This embodiment discloses a technique for expanding the function of the face extraction according to Embodiment 3, and for applying predetermined processing to a face image according to first and second examples of this embodiment.

FIRST EXAMPLE

Figure 26:
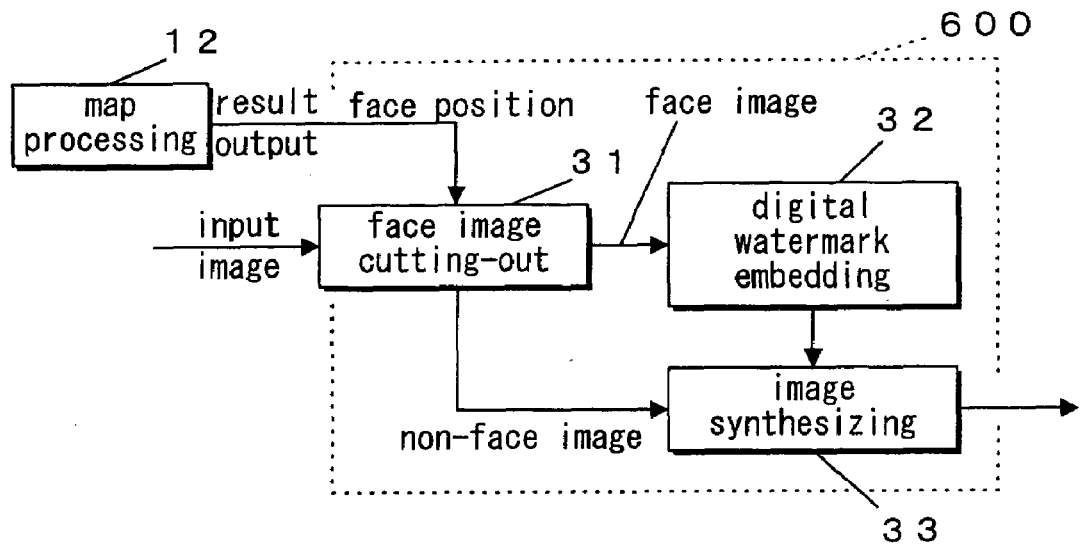
FIG. 26 is a block diagram of a part of an image processing apparatus according to Embodiment 9 (first example) of the present invention.

In the first example, a digital watermark is embedded in an extracted face image. That is, the structure of FIG. 26 is formed. A result using part 600 is provided at the subsequent stage of the map processing unit 12 of FIG. 11.

The result-using part 600 includes a face image cutting-out unit 31 for separating an input image into a face image and a non-face image with reference to the input image and the face position that is determined by the map processing unit 12. The face image part is output from the face image cutting-out unit 31 to a digital watermark embedding unit 32. A predetermined digital watermark is embedded into the face image part. Such digital watermarks are so well known in the art that a detailed description thereof is considered unnecessary.

On the other hand, the part excluding the face image is output from the face image cutting-out unit 31 directly to an image synthesizing unit 33.

The image synthesizing unit 33 combines the face image into which the digital watermark is embedded with the part excluding the face image, and outputs an image into which the digital watermark has been embedded.

Figure 27A:
FIG. 27(a) is a view showing an input image.
Figure 27B:
FIG. 27(b) is a view showing an output image.

Therefore, with respect to, for example, an input image of FIG. 27(*a*), an output image of FIG. 27(*b*) into a face part of which a digital watermark has been embedded is obtained.

The name of a model to be photographed or the date of the photograph is suitable as a digital watermark.

According to this example, digital watermark data can be concentratively and easily embedded into a face part that may be subject to an attempt at falsification.

SECOND EXAMPLE

Figure 28:
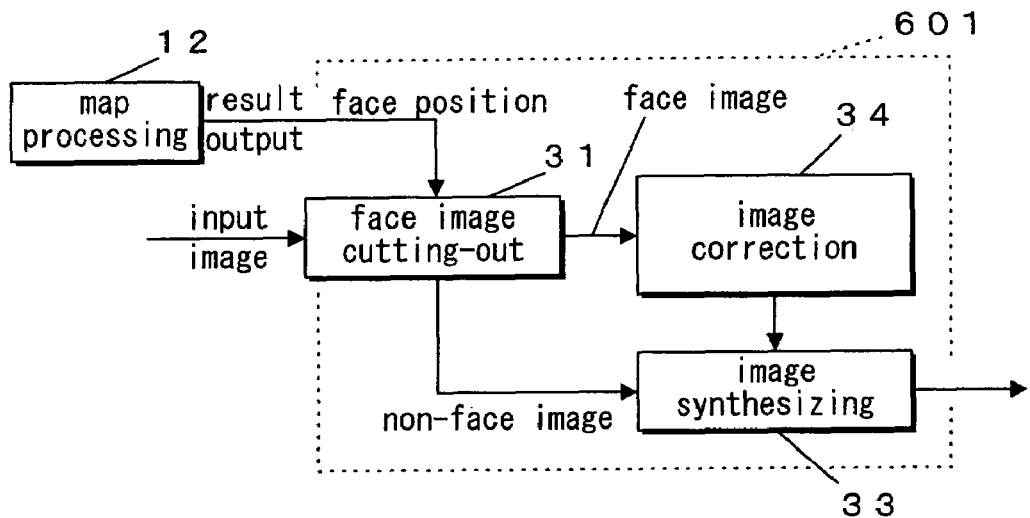
FIG. 28 is a block diagram of a part of the image processing apparatus according to Embodiment 9 (second example) of the present invention.

In this example, specific editing is applied only to an extracted face image. That is, the structure of FIG. 28 is formed. A result-using part 601 is provided at the subsequent stage of the map processing unit 12 of FIG. 11.

The result-using part 601 includes the face image cutting-out unit 31 for separating an input image into a face image and a non-face image with reference to the input image and the face position that is determined by the map processing unit 12. The face image part is output from the face image cutting-out unit 31 to an image correction unit 34, and predetermined editing is applied to the face image part. Herein, such editing is well-known in the art.

On the other hand, the part excluding the face image is output from the face image cutting-out unit 31 directly to the image synthesizing unit 33.

The image synthesizing unit 33 combines the face image that has been edited with the part excluding the face image, and outputs an edited image.

Figure 29A:
FIGS. 29(a) and 29(b) are views showing input images.
Figure 29B:
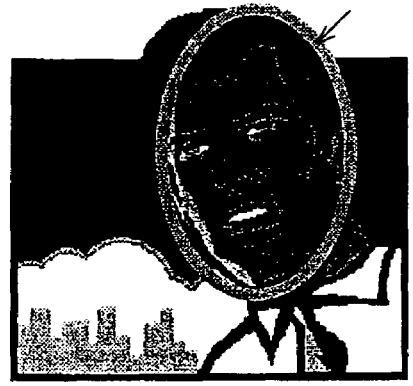
Figure 29C:
FIG. 29(c) is a view of an edited image.

Therefore, referring to, for example, an input image of FIG. 29(*a*), an output image in which a face range has been extracted like FIG. 29(*b*), and only a face part has been edited like FIG. 29(*c*) is obtained.

In an back-lit photographic image of a person, an image of the face part might be corrected so that the face color becomes whitish, to correct for the fact that the back-lit face is too dark and is hard to see. However, in editing by the image correction unit 34, such an image may be arbitrarily corrected.

According to this example, an image of only the face part is easily and selectively corrected, or, in other words, image correction is performed without exerting an influence on a part excluding the face.

THIRD EXAMPLE

Figure 30:
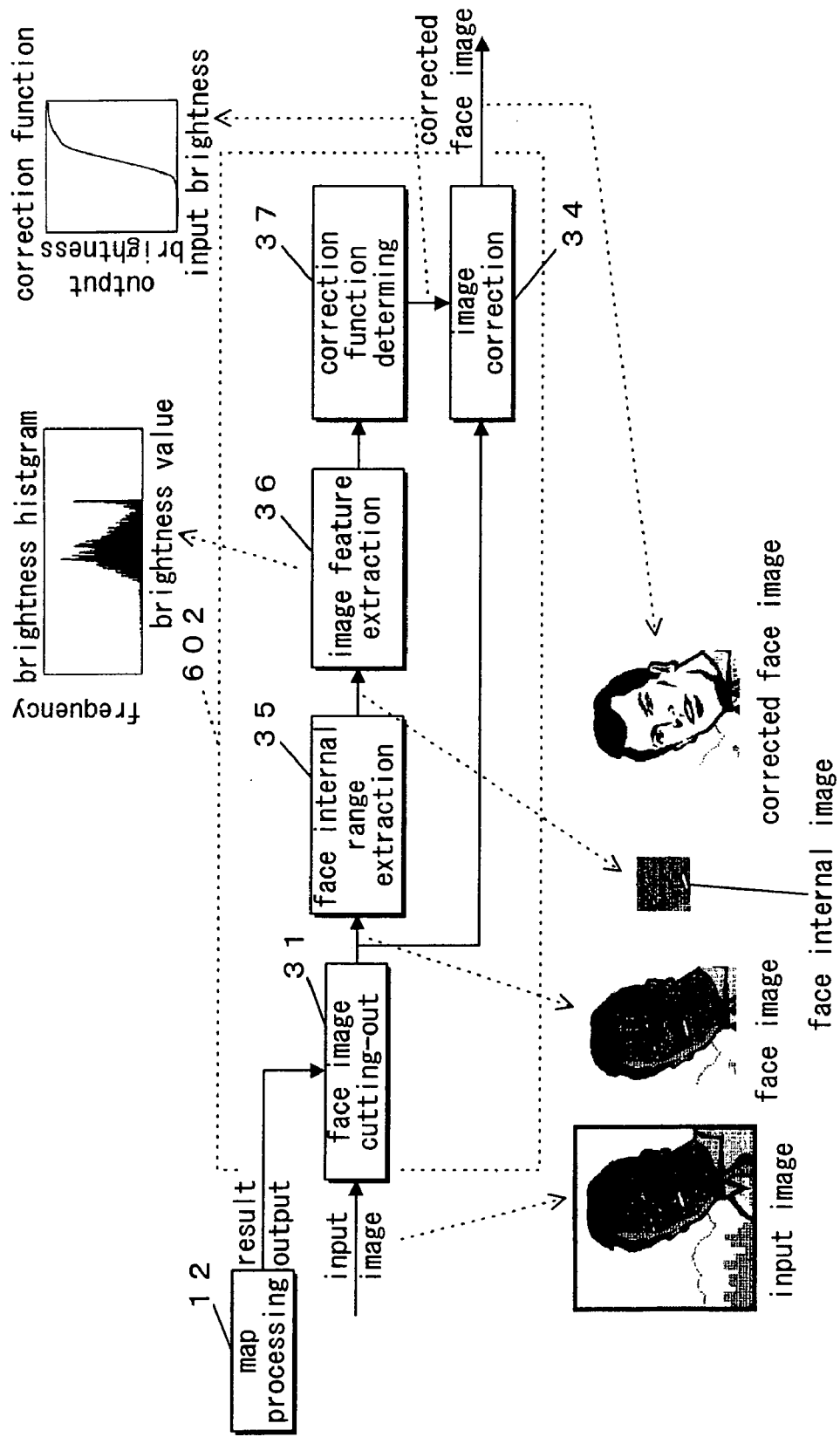
FIG. 30 is a block diagram of a part of the image processing apparatus according to Embodiment 9 (third example) of the present invention.

In this example, an extracted face image is corrected to be easily perceptible. That is, the structure of FIG. 30 is formed. First, a result-using part 602 is provided behind the map processing unit 12 of FIG. 11.

The result-using part 602 includes the face image cutting-out unit 31 for separating an input image into a face image and a non-face image. A face image that has been cut out is output to a face internal range extraction unit 35 and to the image correction unit 34.

According to the procedure described in Embodiment 3, the face internal range extraction unit 35 uses a template to calculate the positions of main face parts, such as eyes, nose, and mouth, from the cut-out face image, and extracts a facial inner image (i.e., the part of the image that is situated inside the facial boundary). In this example, the facial inner image is an image in a rectangular range having a predetermined size and centering the face center (e.g., the center of the nose). However, the size of the rectangular range is changed, and the center is located at a position slightly deviated from the face center.

The extracted facial inner image is output to an image feature extraction unit 36. The image feature extraction unit 36 calculates a useful feature for correction of a face image. In this example, the image feature extraction unit 36 calculates brightness distribution of a facial inner image, and outputs its result to a correction function determining unit 37 in the form of a brightness histogram. The image feature extraction unit 36 can, of course, output a brightness minimum value and a brightness maximum value in the brightness histogram to the correction function determining unit 37.

The correction function determining unit 37 determines a correction function by which the contrast of the facial inner image becomes clearer with reference to a feature input from the image feature extraction unit 36, and outputs this correction function to the image correction unit 34.

In this example, the image feature extraction unit 36 outputs the brightness histogram as mentioned above. Therefore the correction function determining unit 37 calculates a correction function so that the minimum brightness that appears in the histogram reaches the minimum brightness in the dynamic range, and the maximum brightness reaches the maximum brightness therein. Thereafter, the correction function determining unit 37 outputs the correction function to the image correction unit 34.

The horizontal axis of the brightness histogram of FIG. 30 indicates brightness values. It will be understood that only a part of the dynamic range that can express brightness is used. Therefore, the correction function determining unit 37 determines the correction function so as to fully use the dynamic range, and thereby the image correction unit 34 can correct the face image so that the image is easily discerned, or, more specifically, so that it can have abundant gradations in appearance. As a result of this correction, the face image is infallibly easily viewable although there might be a situation in which a part other than the face image is lightened or darkened.

Herein, since the correction function is determined on the basis only of the facial inner image, correction is never misled by a non-face part. Therefore, after correction, it is guaranteed that viewability of the face is improved.

Although FIG. 30 shows the drawing so as to make correction only to the cut-out face image, similar correction is made to the whole input image.

Further, as a feature to be sought by the image feature extraction unit 36, an index that represents the lightness/darkness of an image, such as brightness, is used as described above. In addition, a chroma average or a hue average may be used.

If the chroma average is used, the correction function determining unit 37 can output, for example, a chroma amplification coefficient to the image correction unit 34. If the hue average is used, the correction function determining unit 37 can output, for example, a hue rotational angle to the image correction unit 34.

Herein, a pale face image is more vividly corrected when the chroma average is used as a feature. When the hue average is used, a less reddish face image is corrected to be more reddish. In either case, the face image is made more natural. Additionally, a combination of two or more of brightness, chroma average, or hue average may be used as a feature.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image processing method comprising the steps of:
    inputting a specified image for a template image;
    inputting a specified image for an input image;
    calculating an edge normal direction vector of said specified image;
    generating an evaluation vector from said edge normal direction vector;
    normalizing said evaluation vector of said template image by the number of edge normal direction vectors;
    subjecting said evaluation vector to orthogonal transformation;
    performing a product sum calculation of corresponding spectral data for each evaluation vector that has been subjected to orthogonal transformation;
    subjecting a result of said product sum calculation to inverse orthogonal transformation and generating a map of similarity values; and
    a formula of said similarity values, said orthogonal transformation, and said inverse orthogonal transformation each have linearity.

2. The image processing method of claim 1, further comprising the step of:
    compressing each evaluation vector that has been subjected to orthogonal transformation so as to reduce a processing amount.

3. The image processing method of claim 1, wherein for said template image, the steps taken until said evaluation vector that has been subjected to orthogonal transformation is compressed are executed before said input image is input, and storing results thereof.

4. The image processing method of claim 1, further comprising the step of:
    normalizing said evaluation vector with respect to a vector length.

5. The image processing method of claim 1, further comprising the steps of:
    reducing a data amount using complex conjugate properties of orthogonal transformation before performing a product sum calculation; and
    restoring said data amount after performing said product sum calculation.

6. An image processing method comprising the steps of:
    inputting a specified image for a template image;
    inputting a specified image for an input image;
    enlarging/reducing said template image to various sizes;
    calculating an edge normal direction vector of said specified image;
    generating an evaluation vector from said edge normal direction vector;
    subjecting said evaluation vector to orthogonal transformation;
    subjecting said evaluation vector of each size to addition processing;
    performing a product sum calculation of corresponding spectral data for each evaluation vector that has been subjected to orthogonal transformation;
    subjecting a result of said product sum calculation to inverse orthogonal transformation and generating a map of similarity values; and
    a formula of said similarity values, said orthogonal transformation, and said inverse orthogonal transformation each have linearity.

7. The image processing method of claim 6, wherein, for said template image, said addition processing of said evaluation vector is carried out after executing said step of compressing each evaluation vector so as to reduce the processing amount.

8. The image processing method of claim 1, wherein said template image is an image of a typified face.

9. The image processing method of claim 1, further comprising the steps of:
    preparing a peak pattern that makes a peak of said similarity value steep; and
    subjecting data of said peak pattern to orthogonal transformation to said product sum calculation.

10. The image processing method of claim 1, further comprising the steps of:
    forming a mask pattern that depends on said template image; and
    subjecting data of this mask pattern to orthogonal transformation to said product sum calculation.

11. The image processing method of claim 10, wherein said mask pattern includes an average of a number of pixels in an image of said template image.

12. The image processing method of claim 1, further comprising the steps of:
for said template image, processing positive and negative signs of said evaluation vector of said original template image; and
generating an evaluation vector of a bilaterally symmetrical image with respect to said original template image, by which said generated evaluation vector is applied to said product sum calculation.

13. The image processing method of claim 8, further comprising the steps of:
generating a map of point biserial correlation coefficients on the basis of an extracted face image; and
responsive to said correlation coefficients, calculating a position of said face part.

14. The image processing method of claim 8, further comprising the steps of:
calculating a distribution of projection values in a y-direction on the basis of said extracted face image by use of said mask pattern;
calculating two maximum points from said distribution; and
outputting a range between said two maximum points as a mouth range.

15. The image processing method of claim 8, further comprising the steps of:
dividing said input image into only said face image and parts other than said face image on the basis of said extracted face image;
embedding a digital watermark only into said face image;
combining said face image into which said digital watermark has been embedded with parts other than said face image to produce a combined result; and
outputting said combined result.

16. The image processing method of claim 8, further comprising the steps of:
dividing said input image into only said face image and parts other than said face image on the basis of said extracted face image;
editing only said face image;
combining said face image after editing with parts other than said face image to produce a combined result; are
outputting said combined result.

17. An image processing apparatus comprising:
a template image processing part operable to input a template image and calculate an edge normal direction vector of said template image, normalize said edge normal direction vector of said template image, generate an evaluation vector from said normalized edge normal direction vector, subject said evaluation vector to orthogonal transformation, and compress said evaluation vector that has been subjected to said orthogonal transformation so as to reduce the processing amount:
an input image processing part operable to input an input image and calculate an edge normal direction vector of said input image, generate an evaluation vector from said edge normal direction vector, subject said evaluation vector to orthogonal transformation, and compress said evaluation vector that has been subjected to said orthogonal transformation so as to reduce the processing amount;
an enlargement/reduction unit operable to enlarge or reduce said template image to various sizes;
a multiplication unit operable to perform a product sum calculation of corresponding spectral data about each evaluation vector that has been subjected to said orthogonal transformation and has been obtained for said template image and said input image;
an addition unit operable to perform addition processing of said evaluation vector of each size; and
an inverse orthogonal transformation unit operable to subject a result of said product sum calculation to inverse orthogonal transformation and further operable to generate a map of similarity values;
said evaluation vector including a component in which an edge normal direction vector of a specified image undergoes even-numbered times angular transformation, and a formula of said similarity values, said orthogonal transformation, and said inverse orthogonal transformation each have linearity.

18. The image processing apparatus of claim 17, wherein said template image processing part includes a recording unit operable to record said evaluation vector that has been compressed to reduce a processing amount and that has been subjected to orthogonal transformation, and a result obtained by compressing said evaluation vector that has been subjected to orthogonal transformation is stored in said recording unit before inputting said input image.

19. The image processing apparatus of claim 17, further comprising:
a conjugate compression unit between said recording unit and said multiplication unit;
said conjugate compression unit operable to reduce the data amount using complex conjugate properties of orthogonal transformation;
a conjugate restoring unit between said multiplication unit and said inverse orthogonal transformation unit; said conjugate restoring unit operable to restore the data amount reduced by use of the complex conjugate properties of orthogonal transformation.

20. The image processing apparatus of claim 17, wherein said addition unit is further operable to perform addition processing of said evaluation vector of said template image after compressing said vector so as to reduce the processing amount.

21. The image processing apparatus of claim 17, further comprising a peak pattern processing unit operable to subject a peak pattern by which a peak of a similarity value is made steep to orthogonal transformation and compress said peak pattern that has been subjected to said orthogonal transformation so as to reduce the processing amount, wherein a result obtained by subjecting data of this peak pattern to said orthogonal transformation is applied to a product sum calculation of said multiplication unit.

22. The image processing apparatus of claim 17, further comprising:
a mask pattern processing part operable to form a mask pattern that depends on said template image and generate data obtained by subjecting data of this mask pattern to orthogonal transformation and by compressing it, wherein a processing result of said mask pattern processing part is applied to a product sum calculation of said multiplication unit.

23. The image processing apparatus of claim 22, wherein said mask pattern includes a mean of a number of pixels inside an image of said template image.

24. The image processing apparatus of claim 17, further comprising:
a symmetric vector generation unit operable to process positive and negative signs of said evaluation vector of an original template image recorded in said recording unit, and further operable to generate an evaluation vector of a bilaterally symmetric image with respect to said original template image, wherein said evaluation vector generated by said symmetric vector generation unit is applied to a product sum calculation of said multiplication unit.

25. The image processing apparatus of 17, further comprising a map forming unit operable to form a map of a point biserial correlation coefficient on the basis of an extracted face image, and an extraction unit operable to calculate a position of a face part from the formed map.

26. The image processing apparatus of 17, further comprising a maximum point extraction unit operable to calculate a projection value distribution in a y direction by use of a mask pattern on the basis of an extracted face image, and further operable to calculate two maximum points from this distribution, and outputting a range between said maximum points such as a mouth range.

27. The image processing apparatus of 17, further comprising:
  a face image cutting-out unit operable to separate an input image into only a face image and parts excluding said face image on the basis of an extracted face image;
  a digital watermark embedding unit operable to embed a digital watermark only into the face image; and
  an image synthesizing unit operable to combine said face image into which said digital watermark has been embedded with parts excluding said face image and outputting the combined data.

28. The image processing apparatus of 17, further comprising:
  a face image cutting-out unit operable to separate an input image into only a face image and parts excluding said face image on the basis of an extracted face image;
  an image correction unit operable to edit only said face image; and
  an image synthesizing unit operable to combine an edited face image with parts excluding said face image and outputting them.

29. The image processing method of claim 8, further comprising:
  cutting out a face image from said input image on the basis of an extracted face image;
  extracting a facial inner image from said face image that has been cut out;
  calculating a feature that correct said face image on the basis of said extracted face image;
  determining a correction function on said basis of said obtained feature; and
  applying image correction based on said determined correction function at least onto said face image that has been cut out.

30. The image processing method of claim 29, wherein said feature is a combination of at least two of brightness, chroma average, and hue average.

31. The image processing apparatus of 17, further comprising:
  a face image cutting-out unit operable to cut out a face image from said input image on a basis of an extracted face image;
  a face internal range extraction unit operable to extract a facial inner image from said face image that has been cut out;
  a image feature extraction unit operable to calculate a feature that serves to correct said face image on a basis of said extracted face image;
  a correction function determining unit operable to determine a correction function on a basis of said obtained feature; and
  a image correction unit operable to apply image correction based on said determined correction function at least onto said face image that has been cut out.

32. The image processing apparatus of claim 31, wherein said feature is a combination of at least two of brightness, chroma average, and hue average.

* * * * *

UNITED STATES PATENT AND TRADEMARK OFFICE
CERTIFICATE OF CORRECTION

PATENT NO. : 7,227,996 B2
APPLICATION NO. : 10/057756
DATED : June 5, 2007
INVENTOR(S) : Kazuyuki Imagawa et al.

It is certified that error appears in the above-identified patent and that said Letters Patent is hereby corrected as shown below:

On the Title page, in item (56), under "Other Publications", in column 2, line 4, delete "CA,;" and insert -- CA; --, therefor.

Column 12, line 27, after "$\ddot{y}\, \dot{y}$" insert -- of --.

Column 16, line 9, delete "(x, 1, y + m)" and insert -- (x + 1, y + m) --, therefor.

Column 16, line 67, after "18(a)" insert -- . --.

Column 17, line 39, after "T'y(x,y)" insert -- ) --.

Column 17, line 54, after "(-x,y" insert -- ) --.

Column 17, line 56, after "(-x,y" insert -- ) --.

Column 19, line 2, after "wherein" insert -- , --.

Column 20, line 9, delete "comers" and insert -- corners --, therefor.

Column 23, line 7, delete "filly" and insert -- fully --, therefor.

Column 25, line 54, in Claim 17, after "amount" delete ":" and insert -- ; --, therefor.

Column 27, line 5, in Claim 25, before "17," insert -- claim --.

Column 27, line 10, in Claim 26, before "17," insert -- claim --.

Column 27, line 17, in Claim 27, before "17," insert -- claim --.

Column 27, line 28, in Claim 28, before "17," insert -- claim --.

UNITED STATES PATENT AND TRADEMARK OFFICE
CERTIFICATE OF CORRECTION

PATENT NO. : 7,227,996 B2
APPLICATION NO. : 10/057756
DATED : June 5, 2007
INVENTOR(S) : Kazuyuki Imagawa et al.

It is certified that error appears in the above-identified patent and that said Letters Patent is hereby corrected as shown below:

Column 28, line 17, in Claim 31, before "17," insert -- claim --.

Signed and Sealed this

Sixth Day of November, 2007

JON W. DUDAS
*Director of the United States Patent and Trademark Office*